Nov. 9, 1943.   C. A. STICKEL   2,333,899
REFRIGERATING APPARATUS
Filed May 25, 1934   11 Sheets-Sheet 1

Inventor
Carl A. Stickel
By Spencer Hardman and Fehr
Attorneys

Nov. 9, 1943.     C. A. STICKEL     2,333,899
REFRIGERATING APPARATUS
Filed May 25, 1934     11 Sheets-Sheet 2

Inventor
Carl A. Stickel
By Spencer Hardman and Fehr
Attorneys

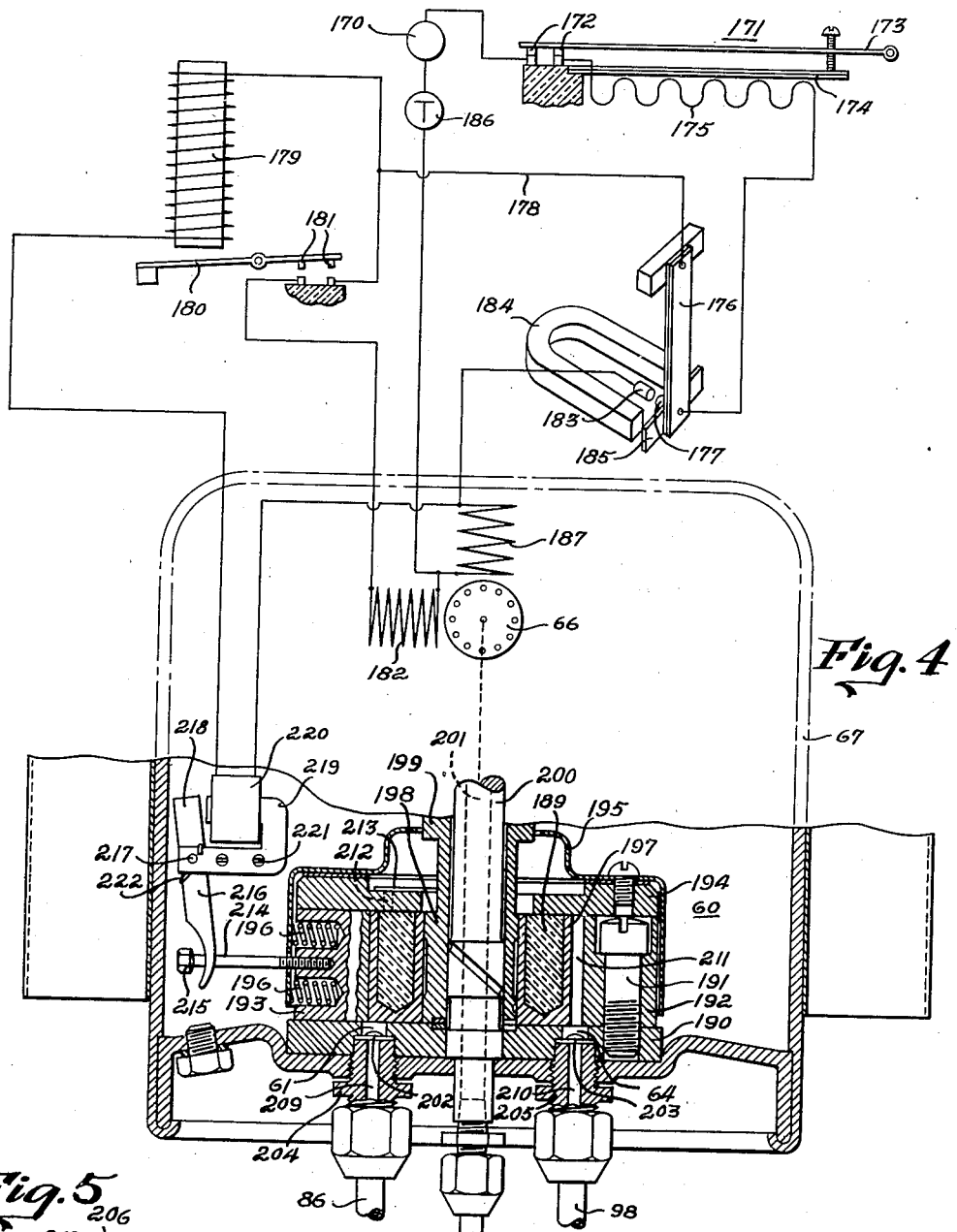

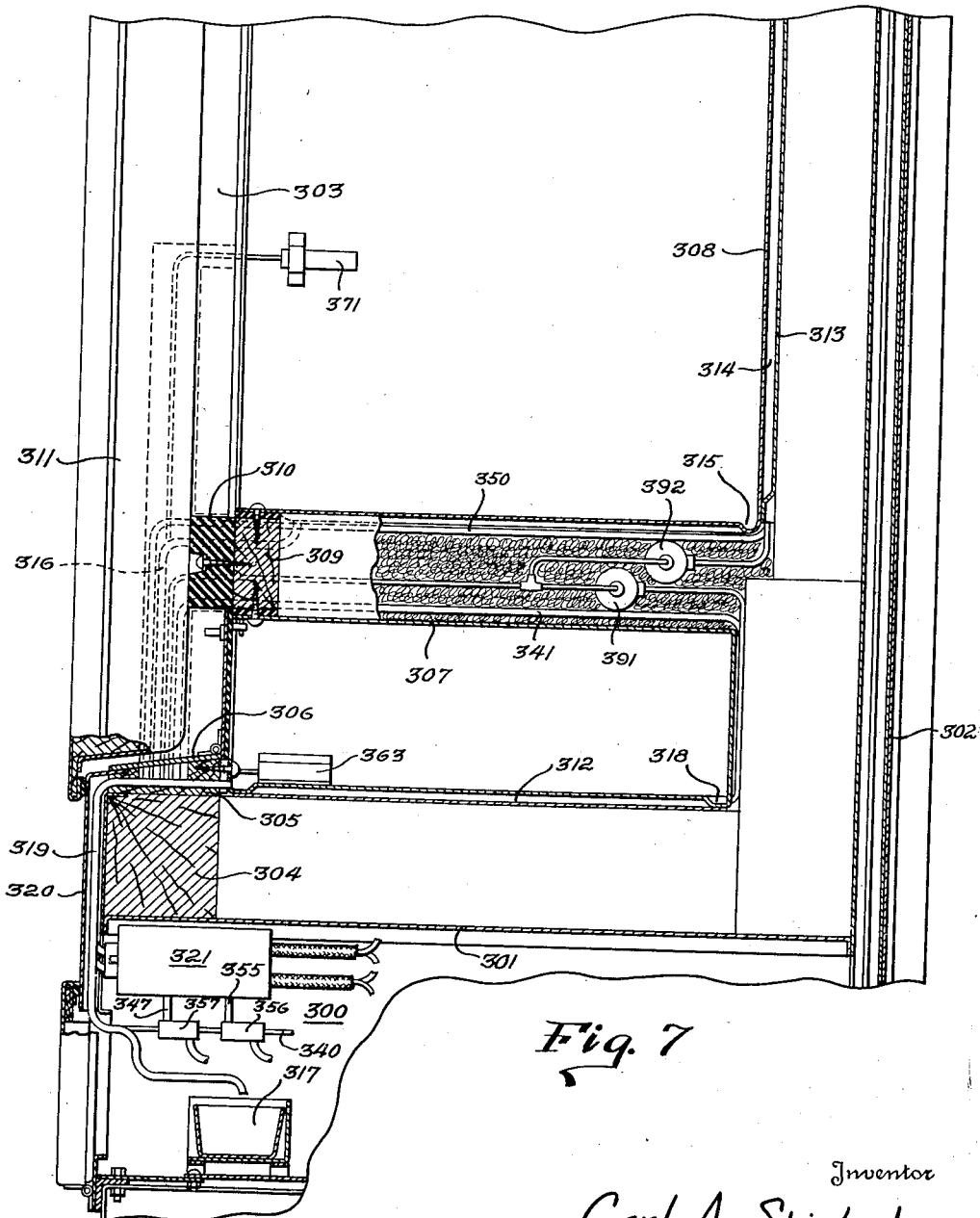

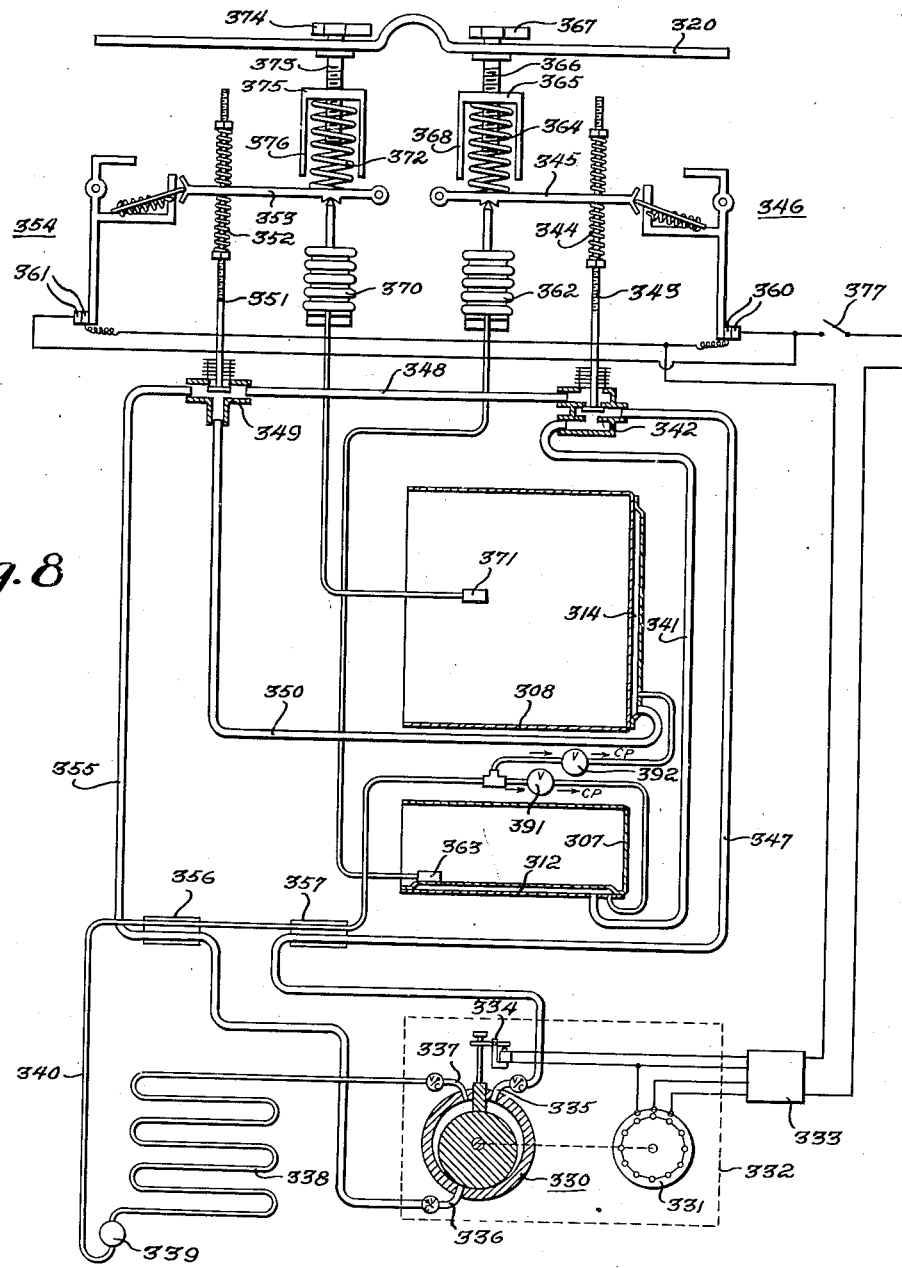

Nov. 9, 1943.  C. A. STICKEL  2,333,899
REFRIGERATING APPARATUS
Filed May 25, 1934   11 Sheets-Sheet 7

Inventor
Carl A. Stickel
By Spencer Hardman and Fehr
Attorneys

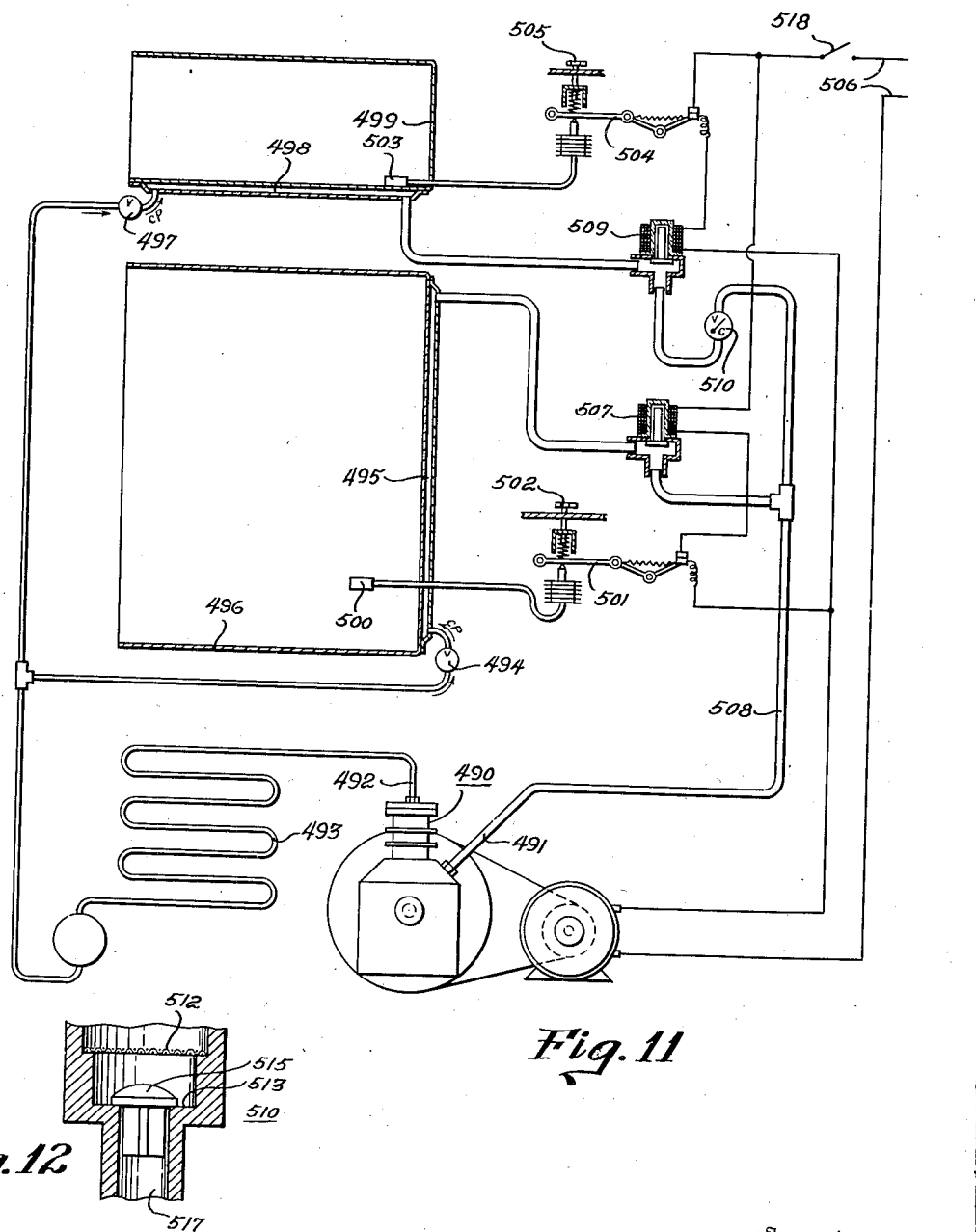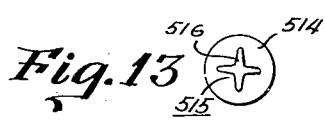

Nov. 9, 1943.                C. A. STICKEL                2,333,899
                        REFRIGERATING APPARATUS
                        Filed May 25, 1934        11 Sheets-Sheet 9

Inventor
Carl A. Stickel
By Spencer Hardman and Fehr
Attorneys

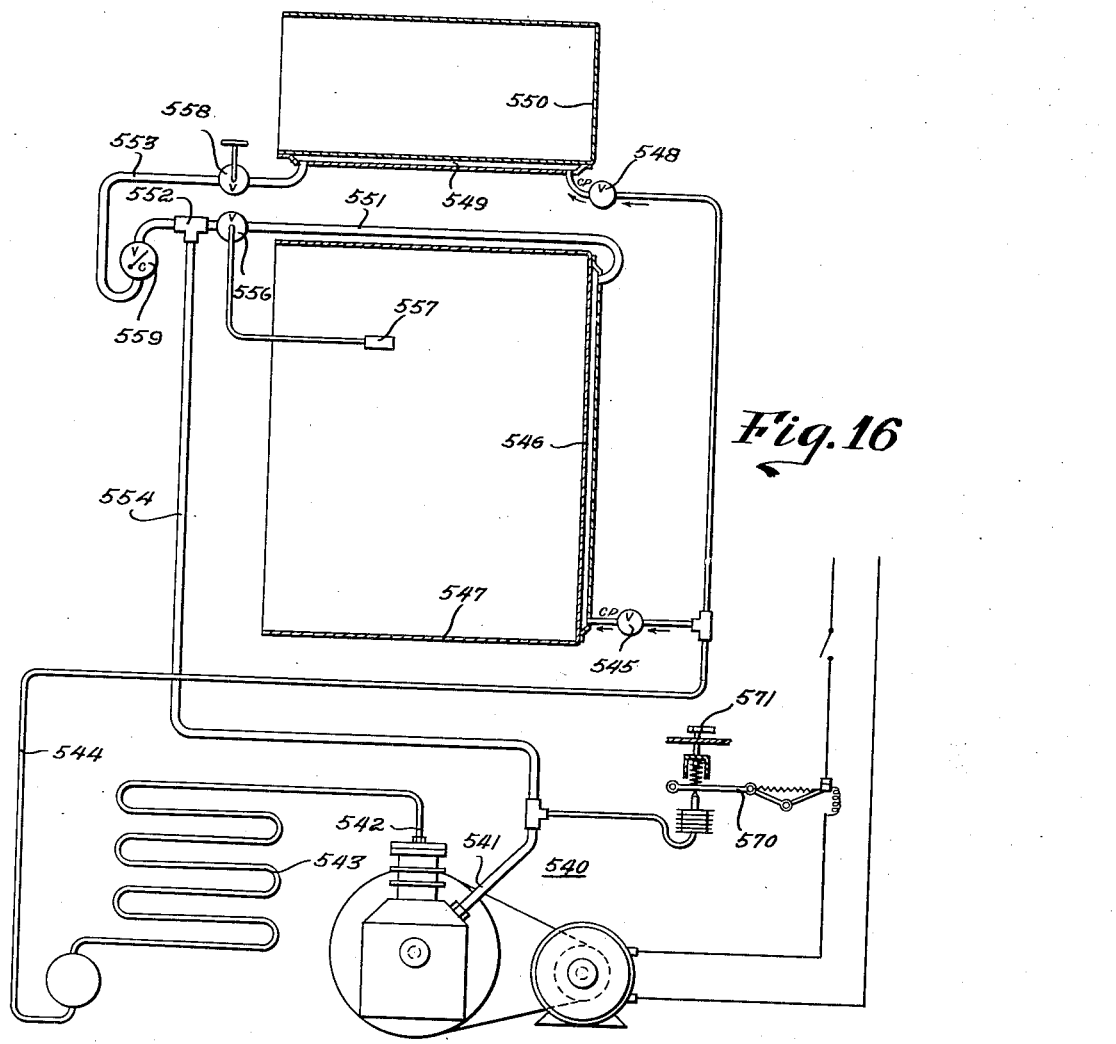
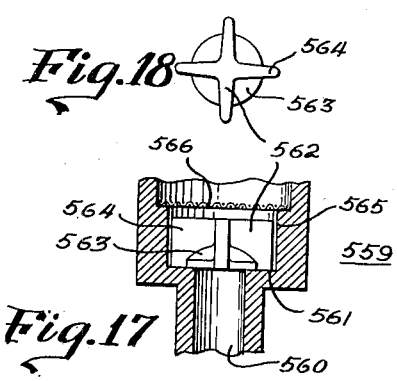
Fig. 16
Fig. 17
Fig. 18

Patented Nov. 9, 1943

2,333,899

UNITED STATES PATENT OFFICE 2,333,899

REFRIGERATING APPARATUS

Carl A. Stickel, Dayton, Ohio, assignor to General Motors Corporation, Dayton, Ohio, a corporation of Delaware Application May 25, 1934, Serial No. 727,507

30 Claims. (Cl. 62—4)

This invention relates to refrigerating apparatus and more particularly to two temperature refrigerators.

It is an object of my invention to provide improved two temperature refrigerators having means for freezing water and comestibles as well as preserving food wherein full advantage is taken of the two temperature operation to provide increased operating economy with increased flexibility of operation and improved control of temperatures and humidity conditions and at the same time avoiding frosting and defrosting of the evaporating means as far as possible.

It is another object of my invention to provide improved refrigerators in which the heat leaking through the insulated walls of the cabinet is removed as directly and efficiently as possible and particularly to prevent the heat leaking through the insulated walls from heating the air within the cabinet by providing a removable evaporating means in heat exchange relation with and forming part of the inner metal liner structure, thus avoiding the necessity of removing the heat from the air at this latter stage of heat leakage.

It is a further object of my invention to provide improved two temperature refrigerating systems in which separate evaporating means may be maintained at different evaporating temperatures and pressures with independent control of each by a single simple refrigerant compressing and condensing means capable of taking full advantage of the relatively high evaporating pressures which may be used in a portion or at times in all of the evaporating means of a two temperature refrigerating system.

It is another object of my invention to provide improved control systems for two temperature refrigerators capable of providing great flexibility of control while maintaining high thermal efficiency and exceptional economy under a variety of operating conditions.

Further objects and advantages of the present invention will be apparent from the following description, reference being had to the accompanying drawings, wherein a preferred form of the present invention is clearly shown.

In the drawings:

Fig. 4 is a view partly in section and partly diagrammatic of the motor-compressor unit together with the starting control of the system for the refrigerator shown in Fig. 1;

Fig. 5 is a plan view of one of the check valves shown in Fig. 4;

Fig. 6 is a sectional view along the line 6—6 of Fig. 5;

Fig. 7 is a fragmentary transverse vertical sectional view through another form of two temperature refrigerator embodying my invention;

Fig. 8 is a diagrammatic illustration of the two-temperature refrigerating system for the refrigerator shown in Fig. 7;

Fig. 11 is a diagrammatic illustration of another form of two-temperature refrigerating system for the refrigerator shown in Fig. 1;

Fig. 12 is a sectional view showing the check valve found in Fig. 11;

Fig. 13 is a bottom view of the valve itself shown in Fig. 12;

Fig. 16 is a diagrammatic illustration of another form of two-temperature refrigerating system for the refrigerator shown in Fig. 1;

Fig. 17 is a sectional view of the check valve shown in Fig. 16;

Fig. 18 is a top view of the check valve shown in Fig. 17;

Figure 1:
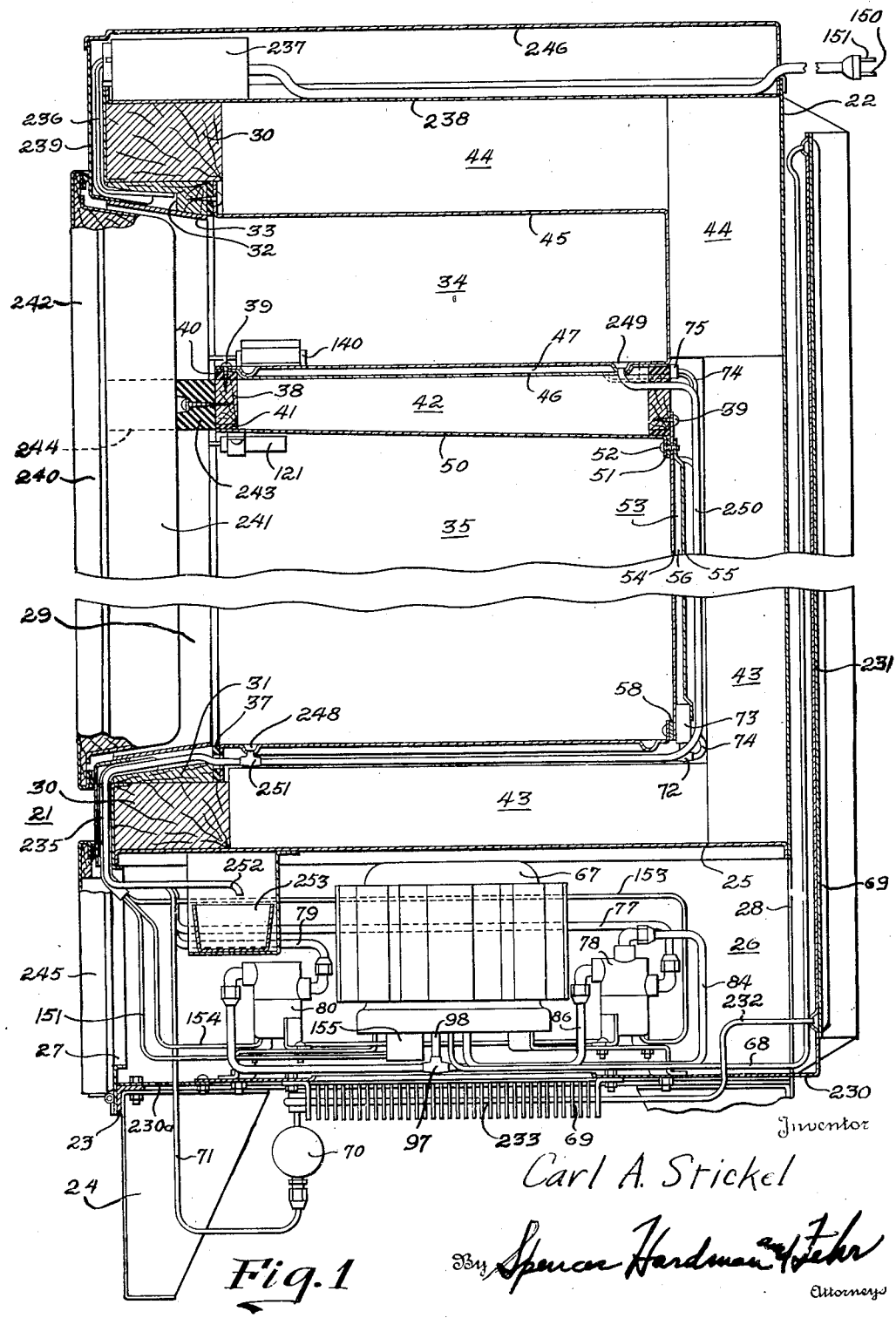
Fig. 1 is a vertical transverse sectional view through a refrigerator cabinet embodying my invention.

Referring to the drawings and more particularly to Fig. 1 there is shown a two-temperature refrigerator 21 having outer self-sustaining sheet metal walls 22 extending around the front and sides of the refrigerator and having the end portions joined together at the rear of the cabinet. This forms a vertical tubular member which is provided with an angle iron member 23 extending around the bottom portion of the sheet metal walls and having supporting legs 24 at each corner of the cabinet for supporting the sheet metal walls. At the top of the outer walls forming the vertical tubular member there is provided a transverse sheet metal partition 238 having its edges fastened and sealed to the outer walls. At an intermediate point the sheet metal walls are provided with a horizontal transverse partition 25 fastened to and sealed to the sheet metal walls and which divides the refrigerator into a machine compartment 26 and the upper food compartments. The machinery compartment 26 is provided with a flanged opening 27 at its front portion and an opening 28 at the rear.

The front sheet metal wall is also provided with a flanged door opening 29 above the machine compartment for access to the food compartment. Surrounding the door opening 29 and fastened thereto is a rectangular door jamb frame 30 of some suitable low conducting material such as wood treated to exclude moisture. Within the door jamb frame there is provided a rectangular frame-like door molding 31 also formed of similarly treated wood which extends around the interior of the door jamb frame. This door molding is fastened to the door jamb frame and the door jamb frame is in turn fastened to the outer sheet metal walls. The door molding is provided with a groove 32 therein which extends completely around the face thereof for carrying electric and refrigerant conductors. This groove is normally covered by finishing strips 33 of some suitable finishing material such as hard rubber or a phenol condensation or cellulose acetate product which are fastened to the wooden portion of the door molding by wood screws or other suitable means.

To the rear face of the door molding there is fastened by wood screws a plurality of open box-like sheet metal structures 34 and 35 which enclose the freezing and food compartments respectively and form the inner liners thereof. Each of these box-like structures is provided with a flange which is fastened to the rear face of the door molding by screws, nails or other suitable fastening means. In order to hermetically seal this joint a rubber gasket 37 is provided which extends between the rear face of the door molding and the adjacent flanges of the box-like sheet metal structures 34 and 35. Between the box-like sheet metal structures 34 and 35 there is provided an open rectangular structural insulating frame 38 to which each of the box-like sheet metal structures 34 and 35 are fastened by wood screws or other suitable means designated by the reference character 39. This open rectangular frame member preferably has its sides extended so as to abut the rubber sealing gasket 37 in order to complete the sealing of the insulation spaces. Rubber sealing gaskets 40 and 41 are provided for sealing the connection between the open rectangular frame and the open box-like sheet metal structures forming the inner liners of the refrigerator.

Within the open rectangular structure insulating frame member 38 there is provided an insulating panel 42 in the form of the waterproof, hermetically sealed, package type of insulation. This together with the open rectangular structural insulating member insulates the freezing compartment 34 from the food compartment 35. Insulating panels or packages 43 are provided between the inner liner structure 35 and the hermetically sealed outer sheet metal walls of the cabinet for insulating the food compartment while much thicker water proofed hermetically sealed insulating packages 44 are provided between the walls of the freezing compartment 34 and the outer sheet metal walls of the refrigerator for providing adequate insulation for the freezing compartment.

The freezing compartment 34 is provided with a single thickness of sheet metal 45 around all of the sides excepting the bottom where a second sheet of metal 46 is welded or otherwise suitably fastened thereto to provide an evaporating space 47 which extends substantially beneath the entire bottom of the freezing compartment. This additional sheet metal piece 46 is preferably provided with serpentine grooves therein so as to provide serpentine refrigerant passages between the sheet of metal 46 and the sheet metal 45. If desired these passages may extend serially from one side of the evaporating plate portion to the other to provide different temperatures in different portions of the bottom plate.

Referring now to the sheet metal structure forming the inner liner of the food compartment 34, there is provided a strip of sheet metal 50 which extends around the top and bottom and sides of the food compartment and which has its end portions joined to provide a complete rectangular structure. In addition to the flanges along its front edge portions, this rectangular sheet metal structure is provided with an inturned flange 51 which extends around its rear edges. To this flange 51 there is fastened by means of the screws 52 or other suitable means a removable evaporator plate 53 formed of an inner sheet 54 and an outer sheet 55 which are welded together. The sheet 55 is provided with serpentine grooves or other forms of refrigerant passages so as to provide a refrigerant space 56 between the two plates. The inner sheet 54 is preferably perfectly flat so as to present an appearance similar to the other sides of the inner liner structure. This plate type evaporating means may be fastened directly to the flange 51 and through this connection it is placed in heat transfer relation with the rectangular sheet metal structure forming the remaining walls of the inner liner of the food compartment. However, in order to obtain the maximum heat transfer and to insure the sealing of the joint between the evaporating plate and the open rectangular structure, I provide a lead or other suitable heat conducting gasket 58 extending between the flange 51 and the abutting edge portions of the plate evaporator 53.

The freezing and food compartment inner liner structures are preferably provided with a porcelain coating or metal plating. By making the evaporator portion removable from the remainder of the food compartment inner liner structure, the application and the burning of the porcelain coating thereon is facilitated. If desired, freezing compartment inner liner structure may be constructed in a manner similar to that of the food compartment inner liner structure with the evaporating portion removable from the remainder of the freezing compartment inner liner structure but normally connected thereto by screws and a lead sealing gasket.

Figures 2, 3:
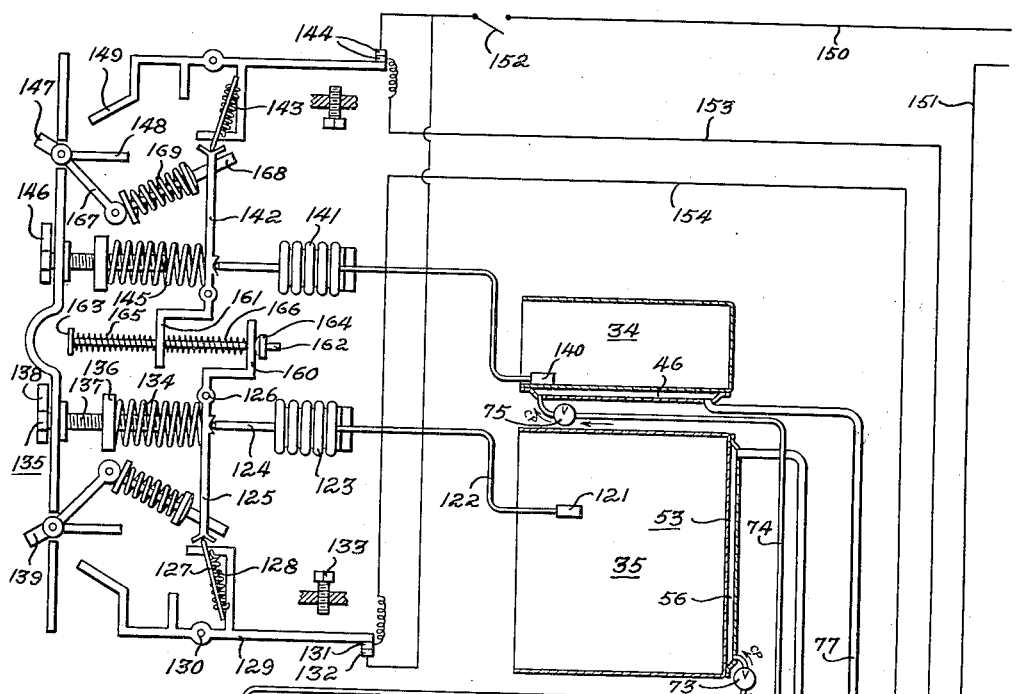
Fig. 2 is a diagrammatic illustration of the two temperature refrigerating system for the cabinet shown in Fig. 1.
Fig. 3 is a sectional view of one of the electrical control valves shown in Fig. 2.

Referring now more particularly to Fig. 2 for an explanation of the refrigerating system there is shown diagrammatically a rotary compressor 60 of the eccentric type provided with a low pressure suction inlet port 61 close to a spring pressed divider block 62. A discharge port 63 is provided on the opposite side of the divider block 62 and a high pressure suction inlet port substantially opposite the low pressure inlet port 61 entering the compression space at a point intermediate the low pressure inlet and the discharge port. This high pressure port 64 however, may communicate with the compression space at any desired point between the low pressure port 61 and the discharge port 63 in order to withdraw the desired proportion of low pressure and high pressure gas from the low and high pressure suction ports. Each of these ports is provided with a suitable check valve. The divider block 62 cooperates with an eccentric 65 which is driven by an electric motor 66. The electric motor and the compressor are located within a sealed casing 67 to form a sealed unit.

The refrigerant is compressed within the compressor 60 and forwarded through a supply conduit 68 to a condensing means 69 where the compressed refrigerant is liquefied and collected in a receiver 70. From the receiver 70 the liquid refrigerant is forwarded through a supply conduit 71 to a T connection 72. From the T connection 72 the portion of the liquid refrigerant is supplied to an expansion valve or a restrictor 73 which controls the flow of liquid refrigerant into the evaporating space 56 within the evaporator plate 53 forming the rear portion of the inner liner structure 35 of the food compartment.

From the T-connection 72 liquid refrigerant is also forwarded through a conduit 74 to an expansion valve or restrictor 75 which controls the flow of liquid refrigerant into the evaporating space 46 in the bottom portion of the freezing compartment and inner liner structure 34. The liquid refrigerant within the evaporator space 46 evaporates because of the absorption of heat from the freezing compartment and in particular from the ice trays which ordinarily rest upon the bottom of the freezing compartment and this evaporated refrigerant is returned through a return conduit 77 to a double acting electro-thermal valve 78. The liquid refrigerant within the evaporating space 56 in a similar manner absorbs heat from the food compartment 35 as well as the heat leakage which leaks through the insulated walls of the refrigerator. This absorption of heat causes the liquid refrigerant to be evaporated and this evaporated refrigerant is removed through a return conduit 79 which connects to a single acting electro-thermal valve 80.

Referring more particularly to Fig. 3 for a more particular disclosure of the electro-thermal valve 78, there is provided a valve body 81 provided with an inlet 82 which connects to the return conduit 77 and a second inlet 83 which connects to a conduit 84. The valve is also provided with an outlet 85 which connects to a return conduit 86 connecting with the low pressure suction inlet 61. Within the valve body there is provided a valve seat 87 for closing the inlet 82 and a second valve seat 88 for closing the inlet 83. A double acting valve 89 is provided which is adapted to seat upon each of these seats and which is moved from one seat to the other by an electro-thermal means including a valve stem 90 having its opposite end provided with a head and threaded to a movable bellows plate 91 sealed to a bellows 92 which is fastened and sealed to a portion of the wall surface of the valve body 81. Within the bellows 92 there is provided a compression type coil spring 93 which tends to move the valve 89 into engagement with the seat 87.

Surrounding the bellows 93 there is provided a cup-shaped insulating member 94 which has its edges sealed to the valve body. Within this insulating cup-shaped member 94 there is provided a volatile fluid 95 such as a volatile refrigerant and an electric heater 96 of some suitable type submerged within the volatile fluid.

When electric energy is passed through the electric heater 96, the volatile fluid evaporates and exerts a pressure upon the bellows so as to move the movable end plate 91 upwardly so as to move the valve 89 from the seat 87 into engagement with the seat 88. This closes off the inlet 83 and provides communication between the inlet 82 and the outlet 85. Instead of a double acting valve, two single acting valves may be used, one for closing the by-pass 84 when energized, and one for closing the return conduit 77 when de-energized. The structure of the electro-thermal valve 80 is similar except that a plug is provided instead of the inlet 83. Instead of the electro-thermal valves shown in Figs. 2 and 3, electro-magnetic valves such as are shown in Fig. 11 may be used. The outlet of the electro-thermal valve 80 leads to a T connection 97 which connects with the by-pass conduit 84 as well as the high pressure return conduit 98 connecting with the high pressure suction port 64.

Within the food compartment 35 exposed to the air therein but separated from and insulated from the sheet metal walls of the inner liner structure there is provided a thermostatic bulb 121 which is charged with a volatile or thermally expansible fluid. This thermostat bulb is connected by tubing 122 to a metal bellows 123 provided with a bellows follower 124 which bears against and is adapted to move a main switch lever 125 of a double toggle type of switch mechanism. This main switch lever 125 is pivoted at 126 and at the opposite end is pivotally connected to the secondary lever 127 which in turn is connected by a tension spring 128 to the switch contact lever 129 pivoted at 130. The switch contact lever 129 is provided with a movable contact 131 which is adapted to engage a stationary contact 132 upon closing movement and a set screw 133 upon opening movement which serves as a stop and which also serves as a differential adjustment by varying the alignment of the secondary lever 127 and the toggle spring 128 when tripping to closing position from open position.

The expansion of the metal bellows 123 is opposed by a compression type spring 134 which has its tension controlled by a selective temperature adjusting means 135 including a spring retainer 136 threaded upon a temperature adjusting screw 137 which is rotated by a combined finger manipulator and indicating means 138 so as to regulate the temperature at which the contacts 131 and 132 are opened and closed by a thermostat bulb 121. A thermostat 140 charged with a volatile fluid or thermally expansible fluid is provided within the freezing compartment 34 in heat exchange relation with the evaporating space 46 at the bottom of the freezing compartment. This thermostatic bulb 140 is connected by tubing to a bellows 141 which operates a main lever 142 provided with a double toggle snap acting mechanism 143 for controlling the opening and closing of the switch contacts 144. The expansion of the bellows 141 is controlled by the compression type spring 145 which is controlled by a manual temperature regulating means 146 which controls the opening and closing of the switch contacts 144 according to the temperature of the metal walls of the freezing compartment 34.

In order to shut off refrigeration to the freezing compartment 34 without shutting off refrigeration to the food compartment, I provide a pivoted finger manipulator 147 which has an arm 148 which is adapted to engage when rotated counterclockwise an extension 149 of the switch contact lever which carries one of the switch contacts 144 and forms part of the double toggle mechanism in order to forcibly move the contacts 144 to open circuit position. The finger manipulator 147 also has an arm 167 pivotally connected to a link 168 having its free end freely passing through an aperture in the main lever 142 of the freezing switch. This link 168 is surrounded by a compression type coil spring 169 which is held under some compression between adjustable shoulders provided upon the link 168. The arm 167 together with the link 168 and the spring 169 forms part of a toggle mechanism in connection with the main lever 142 and the extension 149.

When the finger manipulator 147 is moved in a counterclockwise direction, the arm 167 and the link 168 move into a locked position by crossing the dead center position in which the arm 167 and the link 168 are in substantially a straight line into a position slightly beyond the dead center position where the finger manipulator 147 is stopped from further movement in the counterclockwise direction by the engagement of the arm 148 with the extension 149 and by the engagement of the switch contact member with its differential adjusting screw which serves as a stop. When in this position the spring retainer at the adjacent end of the compression spring 169 engages the adjacent surface of the main lever 142 with a pressure sufficient to balance the higher pressure which will exist in the bellows 141 due to the shutting off of refrigeration in the freezing compartment. This will permit the main lever 142 to move freely without closing the switch contacts 144.

The food compartment switch is likewise provided with a similar finger manipulator and toggle type of compensating or balancing shut off mechanism generally designated by the reference character 139.

The refrigerator is supplied with electric energy through the electric conductors 150 and 151. In order to shut off the entire refrigerator, a manually controlled switch 152 is provided in series with the electric conductor 150. Connected to the manual switch 152 are two parallel electric circuits which connect to the starting relay system of the electric motor 66. One of these circuits 153 includes the switch contacts 144 and the electric heater 96 of the electro-thermal valve 78. The other of these parallel circuits 154 includes the switch contacts 131 and 132 as well as the electric heater of the electro-thermal valve 80. These parallel electric circuits 153 and 154 are connected to the starting relay box 155 which encloses the starting relay system of the compressor driving motor 66. The electric conductor 151 is also connected to the starting relay box 155.

Thus when the manual switch 152 is closed the closing of either of the thermostatically controlled switches controlled by the thermostats 121 and 140 will close the circuit to the compressor driving motor 66 to start the operation of the compressor. If the freezing compartment switch operated by the thermostat bulb 140 is in the closed position and the food compartment switch operated by the thermostatic bulb 121 is in the open position, the valve 89 within the electro-thermal valve 78 will be in the position shown in Fig. 2 so that the evaporated refrigerant from the freezing compartment evaporator will be returned directly to the low pressure port 61. At this time the electro-thermal valve 80 will be in the closed position, thus preventing any gas from being withdrawn from the food compartment evaporator 53. Should the food compartment require refrigeration, the thermostatic bulb 121 will close the food compartment switch contacts 131 and 132 which will energize the electro-thermal valve 80 and cause it to open, thus permitting refrigerant to be withdrawn from the food compartment evaporator directly into the high pressure suction port 64.

Under these conditions the compressor 60 will draw refrigerant from the freezing compartment evaporator through the low pressure suction port 61 until the high pressure suction port 64 is uncovered. After the high pressure suction port is uncovered, the high pressure gas will fill up the suction chamber within the compressor with the high pressure gas so that for the remainder of the suction stroke the compressor will operate at the back pressure corresponding to the evaporating pressure of the freezing compartment evaporator. The check valve in the low pressure suction port prevents the high pressure gas from passing from the compressor suction chamber into the low pressure suction ring. The compressor then compresses the gas so drawn from both the low pressure suction inlet and the high pressure suction inlet and discharges this gas from the compressor through the discharge port 63. The check valve in the high pressure suction line prevents any gas from flowing out of the compressing chamber into the high pressure return line.

If the freezing compartment switch controlled by the thermostat 140 opens and the food compartment switch remains closed, the electro-thermal valve 78 will close the inlet from the freezing compartment evaporator and permit the high pressure gas passing into the electro-thermal valve 80 to flow therefrom through the by-pass conduit 84 into the inlet 83 into the low pressure suction conduit 86 so that the compressor 60 will operate during its entire stroke or revolution at the back pressure corresponding to the back pressure within the freezing compartment or high pressure evaporator 53.

In order to influence the freezing and food compartment switches to be both closed at the same time so that refrigerant vapor is drawn from both the freezing compartments evaporator and the food compartment evaporator at the same time when each requires refrigeration or is about to require refrigeration, I provide a resilient connection between the two switches which is very light but which tends to partially compensate for the switch differential. This resilient connection with a very light force tends to cause both switches to open and close at the same time but since this force is very light the switches under certain conditions may operate independently. For this resilient connection I provide an extension 160 extending from the main lever 125 and an extension 161 extending from the main lever 142 of the freezing compartment switch. These two extensions are resiliently connected together by a resilient connection which includes a threaded rod or bolt 162 provided with a head or spring retainer 163 at one end and a nut 164 forming a second spring retainer at the opposite end. This rod or bolt slides freely through openings in the extensions 160 and 161. Between the head 163 of the rod or bolt 162 and the extension 161 there is provided a very light compression type coil spring 165 while between extension 161 and the extension 160 there is provided a similar light compression spring 166. These compression springs 165 and 166 are extremely light and are only sufficient to transmit a force of from one of the main levers to the other of about one-half of the differential of either of the switches. Thus this resilient connection tends to keep the switches in step but prevents any substantial departure from the temperature control provided by each of the switches. This resilient connection therefore tends to cause the compressor to draw refrigerant from both of the evaporators at the same time and thus gains the benefit of the relatively lower friction losses and the relatively high volumetric efficiency which may be obtained when the compressor is operating upon the so-called multiple effect cycle.

Referring now more particularly to Fig. 4 for the motor compressor unit and starting relay system, there is diagrammatically illustrated a source of power 170 which supplies electric energy under the control of the thermostatic switches illustrated diagrammatically by the symbol T at 186 to the starting winding 182 and the running winding 187 of the electric motor 66 as well as to a thermal overload device 171 provided with contacts 172 at the end of a lever 173 which may be moved to open the electric circuit by the by-metal strip 174 adapted to be heated by an electric heater 175 in series with the contacts 172. The heater 175 is connected to a by-metal strip 176 which is heated by the electric energy passing therethrough and which carries a movable contact 177 at its lower free end and which is anchored at its upper end. The upper end of the by-metal strip 176 is connected by an electrical conductor 178 to a starting relay coil 179 which is adapted when energized to attract the armature 180 to close the starting relay contacts 181. The starting relay contacts 181 close the electric circuit to the starting winding 182 of the compressor driving motor 66.

After the closing of the two thermostatic switches designated by the symbol T and after the starting relay 179 has closed the contacts 181 for a sufficient length of time to permit starting of the compressor motor 166, the by-metal strip 176 will be heated by the abnormal flow of electric energy passing therethrough during the starting period sufficiently to move the movable contact 177 at its lower end into engagement with a stationary contact 183. The closing of these contacts will be facilitated by the permanent horseshoe type magnet 184 which cooperates with an armature 185 fastened to the lower end of the by-metal strip 176 which will suppress any arcing at the contacts. The closing of the contacts 177 and 183 provides a shunt which substantially de-energizes the starting relay coil 179, thus permitting the starting relay contacts 181 to be opened. The electric compressor driving motor 66 is located within the upper portion of the sealed casing 67 and operates under the control of the two thermostatic switches which herein are designated by the symbol T and the reference character 186.

The compressor driving motor 66 is located within lower portion of the sealed casing 67. The compressor 60 is located upon the bottom of the sealed casing 67. The compressor 60 has a heavy bottom plate 190 to which is fastened by heavy screws 191 a heavy ring-shaped member 192 having an opening in one side which receives a receptacle divider block 193. A top plate 194 is fastened to the top of the ring-shaped member 192. Surrounding the compressor body is an oil controlling shield 195. This shield holds one end of each of the small compression type springs 196 which extend into apertures within the divider block 193 for pressing the divider block with a light force against an eccentrically movable ring 197 which is mounted on an eccentric 198 forming part of the lower end of the compressor driving shaft 199. The ring 197 is drilled to provide cavities 189 which may be filled with a light weight metal such as aluminum or a light weight molding compound such as a cellulose acetate product. This compressor driving shaft is rotatably mounted upon a fixed shaft 200 which provides a bearing support for the driving shaft 199 and which also is provided with a central passage 201 which is used for the outlet of the compressed refrigerant gases.

The bottom plate 190 and the bottom wall of the sealed casing or sealed unit is provided with the inlet ports 61 and 64. These inlet ports are each provided with a shoulder against which the outer portion of the flapper type check valves 202 and 203 are held by the threaded bushings 204 and 204. Referring more particularly to Figs. 5 and 6 for a further showing of these flapper type of check valves there is shown a generally disc shaped member formed of a rubber-like material capable of withstanding the action of the refrigerant used in the system, preferably one of that class of synthetic rubbers known as chloroprene or the polymers of chloro-2-butadiene-1.3; commonly called "Duprene." This generally disc-shaped member is provided with a humped center portion 206 surrounded by a flange portion which is separated from the humped center portion by cutting or forming a slot 207 which extends around the greater portion of the disc-shaped piece spaced from the edge thereof but providing a connecting portion 208 between the center humped portion and the flanged outer portions of the disc-shaped piece. It is the outer ring-like portion which is clamped between the shoulders in the suction ports 61 and 64. The center flapper portion 206 is humped so as to provide a hemi-spherical appearance so as to make the flat portion capable of withstanding the force upon its upper side without being excessively distorted, respectively in the bushings 204 and 205. This yielding resilient rubber-like material is exceptionally quiet, durable and provides a very inexpensive check valve. The gas is drawn through the check valve by the raising of the flapper portion therein. It is returned to its seated position upon the shoulder formed by the upper ends of the bushings 204 and 205 by its own resiliency and also by the force of gravity. Instead of this form of check valve, either of the forms shown in Figs. 12 and 13 or 17 and 18 may be used successfully.

The suction ports 61 and 64 lead to the compression space 211 formed between the ring 197 and the ring-shaped member 192. The rotation of the eccentric 198 causes a gas to be drawn into the compression space 211 from the suction ports 61 and 64 and force the gas through the outlet 212 formed in the top plate 194. This outlet 212 is provided with a check valve 213 of the flat leaf spring type. This compressed gas so discharged fills the interior of the sealed casing 67 excepting for the lower portion thereof which is filled with oil which provides lubricant for the compressor and the driving shaft 199. This compressed gas is withdrawn from the sealed casing 67 through the passage 201 in the central fixed shaft 200.

In order to facilitate starting of the compressor, I provide an improved unloading means therefor. I perform this unloading by pulling out the divider block 193 during the starting period of the compressor to permit unrestricted circulation within the compression chamber in order to prevent any compression from taking place within the compressor. This is done by providing a long screw 214 threaded into the divider block and extending therefrom. This long screw 214 is provided with a head 215 which is adapted to be engaged during the starting period and pulled outwardly by a forked arm 216 pivoted upon a pin 217. The opposite end 218 of this arm 216 forms the armature of an electromagnet which includes a U-shaped iron core 219 having a coil 220 surrounding one leg thereof. This electro-magnet is fastened to the casing of the sealed unit by some suitable means such as the long screws 221. A light torsion spring 222 is provided for lightly urging the forked arm 216 and the armature 218 in a counter-clockwise direction when in the de-energized position. The electro-magnet coil 220 is connected in series with the starting relay coil 179 so that when the starting relay coil 179 is energized during the starting period of the compressor-motor 66, the coil 220 is likewise energized to attract the armature 218 and to move the forked end of the arm 216 into engagement with the head 215 of the long screw 214 to pull out and hold out the divider block away from engagement with the ring 197 during the starting period of the compressor to prevent compression from taking place within the compressor. This provides a very simple form of unloading system which instantaneously completely unloads the compressor and does not even make it necessary for the compressor to push a gas through passages or valves.

Referring now again to Fig. 1 in order to show the location of these parts within the cabinet, the sealed unit 67 as well as the electro-thermal valves 78 and 80 are mounted upon brackets which are fastened to a horizontal sheet metal portion 230 which rests upon ledges 230a formed upon the bottom of the machine compartment in order to seal the machine compartment except for an inlet and an outlet for the cooling air. This sheet metal portion 230 has an upwardly extending portion which forms a part of the initial condensing portion 231 of the condensing means 69. This initial condensing portion 231 is formed of the upwardly extending portion of the sheet metal member 230 together with a second sheet of metal which are welded together to form a very thin condensing space. This primary condensing portion 231 is spaced away from the rear wall of the cabinet but connected and fastened thereto by its edge portions which extend from the top to the bottom of the condensing means so as to provide a stack which communicates only with the machine compartment 26.

The compressed gas discharged from the compressor is forwarded to the top of this primary condensing portion 231 by the supply tubing or conduit 68. At the bottom of this primary condensing portion 231 the liquid and any uncondensed gas is removed by a conduit 232 to a secondary finned condenser 233 located directly beneath an opening in the sheet metal portion 230 beneath the compressor 67. The liquid and any uncondensed gas is further cooled and completely liquefied in this finned condenser which receives the coldest air from near the floor before it is heated by the compressor or the primary condenser. Thus the counterflow principle is used in order to effect complete condensation and efficient cooling of the condensed liquid. The condensed liquid is then collected in the receiver 70 which is connected to the freezing compartment and food compartment evaporating means as heretofore stated.

The entire condensing means as well as the motor-compressor unit, the electro-thermal valves, and the starting relay system are removable as a unit since all are connected together by the sheet metal portion 230. As shown, suitable gland connections are provided for disconnecting the refrigerant lines.

The connections of the refrigerant lines and the electric conductors which connect with the freezing and food compartment evaporators as well as with the switch means, pass out of the machine compartment 26 over the outer face of the cabinet between the machinery compartment and the food compartment and into a cross groove provided within the door molding as shown at 235 in Fig. 1. Within the groove in the door molding these lines separate, the refrigerant supply and return lines extending beneath the inner liner of the food compartment to the restrictors 73 and 75 which extend into a bulged out portion in their respective evaporating means for controlling the supply of refrigerant therethrough and to the outlets of each of these evaporating means respectively. The return conduits may be insulated and provided with heat interchangers as shown in Fig. 8. The electrical conductors extend through the groove or passage in the door molding up to the upper portion thereof and then pass out through a covered cross-groove over the face of the cabinet above the food and freezing compartments as shown at 236 and connect to the switch box 237 which rests upon the top transverse sheet metal partition 238 forming the top portion of the outer shell. This switch box 237 contains the freezing and food compartment switches as well as the manual switch 152 which are shown diagrammatically in Fig. 2. An outer ornamental covering 239 extends over the electric conductors extending over the outer face of the cabinet as shown at 236 to cover these lines. This covering 239 also serves as the ornamental face plate for the switches and fastens to the switch box. The tubing connecting the switch bellows and their thermostats also passes beneath this ornamental covering and extends in the groove formed in the door molding to their respective thermostats 121 and 140. The lower end of the ornamental covering 239 extends in a neat manner beneath the finishing strip 33 so that none of these lines are exposed when the cabinet has been finished.

The cabinet door 240 closes the door opening 29 provided in the cabinet and this door is preferably of the usual construction including a pan portion 241 which extends into the door opening 29 with some clearance and a flange portion 242 is provided with a notch along its upper edge to receive the bulged-out portion of the ornamental cover 239 which also forms the face and dial plate for the switch means as is shown in Fig. 2.

In order to seal the freezing and food compartments 34 and 35 from each other, there is provided a resilient sealing member 243 of some suitable yielding rubber-like material such as sponge rubber which is fastened to the front portion of the open rectangular frame structure 38 between the two inner liner members in any suitable manner such as by screws or a suitable adhesive or both as shown in Fig. 1. This resilient rubber member extends across the insulating portion between the two inner liners and contacts with the rear face of the cabinet door 240 when in its closed position to seal these two compartments from each other. This rubber-like member may be provided with somewhat thinner extensions 244 of a similar rubber-like material which extend within and seal the clearance space between the pan portion 244 and the finishing strip 33 at the sides of the door molding to prevent any movement of air and moisture between the two compartments when the door is closed.

The cabinet door 240 is also provided with a notch in its lower flanged portion to receive the bulged portion of the ornamental cover 235 which contains the refrigerant lines and the electric conductors. A door 245 is provided for the machinery compartment which has a notch in its upper portion for receiving the bulged portion of the ornamental cover 235. An ornamental removable top cover 246 is also provided for the cabinet which extends over the entire top of the cabinet including the ornamental cover plate 239 which provides the indicating face of the switch means.

This type of cabinet will cause very little condensation of moisture therein especially within the food compartment 35 because of the direct way and the high evaporating temperature at which the heat is removed from the cabinet. However, under some conditions it is possible that some moisture will condense upon the walls of the inner liner structure and will run down from these walls. In order to take care of this situation, I have provided grooves 248 which extend around the edges of the bottom wall of the food compartment inner liner structure 35 so as to collect any drip or moisture condensation which should flow down the side walls of the inner liner structure. The top wall of the inner liner structure 35 is inclined so that if any moisture should condense thereon, it will not drop upon the food in the cabinet but will be caused, by the inclination, to flow to the rear wall of the inner liner structure. I have similarly provided the grooves 249 in the inner liner structure 34 of the compartment for collecting any moisture due to the melting of any frost therein or the spilling of any moisture or liquids within this compartment. Any condensate, water, moisture and other liquids are removed from the freezing compartment by the tubing 250 and from the food compartment by a T connection 251 extending from the tubing 250 which, like the refrigerant lines of the electrical conductors, extends through the cross groove in the door molding over the face of the cabinet into the machine compartment beneath the ornamental cover 235 and is provided with a spout 252 which permits the liquids collected by this system to be deposited in a collecting pan 253 supported by a bracket within the machine compartment. This pan member may be removed to dispose of the collected moisture and liquids or suitable evaporating means may be provided for evaporating this moisture.

Thus in my improved two-temperature refrigerator, the compressor takes full advantage of the high evaporating pressure and temperature employed in the food compartment evaporator by operating at the back pressure corresponding to that evaporating pressure during the time it is drawing refrigerant from the evaporator while this same compressor also may operate either at the same time or at a different time at the back pressure corresponding to the evaporating pressure of the low pressure evaporator when drawing refrigerant therefrom. This system of operation provides high capacity and high volumetric efficiency since when drawing refrigerant from the food compartment evaporating means with or without drawing refrigerant from the freezing compartment evaporating means the compression chamber within the compressor is filled to a pressure corresponding to the evaporating pressure within the food compartment evaporator.

The freezing compartment provided herein is especially convenient since its use is not limited to a particular type of tray but pans, dishes, mixing bowls and other ordinary kitchen utensils may be placed therein to the greater convenience of the housewife since it avoids the necessity of transferring the contents of the particular pans and dishes used in preparing and mixing comestibles in the ice trays and then having to return them to the pans for further mixing or beating thereafter. The temperature of the freezing compartment may be varied from very low freezing temperatures to temperatures considerably above freezing even as high as the food compartment temperatures merely by adjusting the conveniently located finger manipulator provided therefor without effecting the food compartment temperature. This freezing compartment may be used not only for freezing purposes but also for any other type of food storage at almost any desired temperature. Inasmuch as many use the freezing facilities of the refrigerator only occasionally, this freezing compartment may be used as an additional food storage compartment at the same or different temperatures from the food compartment. For example, this compartment may be used for freezing meats and keeping them at freezing temperatures or for keeping meats at temperatures above freezing. It also may be shut off when not required or the food storage compartment may be shut off when not required either at a considerable saving in current consumption without lowering the thermal efficiency of the refrigerators.

The food compartment evaporator temperature is controlled by the temperature of the air therein, thus maintaining a constant air temperature within the food compartment regardless of the outside temperature without any compensating means being necessary. The air temperature within the freezing compartment may be varied as desired and refrigeration to the food compartment may be readily shut off when it is desired to use only the freezing compartment.

By cooling through the metal wall structure of the freezing and food compartments, frosting of the evaporated surfaces and de-hydration of the air in these compartments are largely prevented since the heat leakage into the cabinet is not removed from the air as has been customary but is removed directly by these wall structures as it leaks through the insulation. The vertical refrigerant surfaces within the food compartment will not permit any condensation or drip to fall upon the food therein. A particularly convenient means is provided for disposing of such condensed moisture as should be collected within the drip troughs provided therefor.

In addition to all these advantages and conveniences, this refrigerator is inherently very efficient and low in operating expense.

In Fig. 7 another form of my invention is disclosed. In this form the cabinet is provided with sheet metal walls enclosing the cabinet and provided with a sheet metal partition 301 which separates the machine compartment 300 in the lower portion from the food and freezing compartments provided above the machine compartment. The machine compartment is provided with a compressor and starting relay system (not shown) similar to that shown in Fig. 4 and a condensing means 302 located upon the rear wall of the cabinet. The cabinet is provided with a single door opening 303 above the machine compartment 300 which is surrounded by a door jamb frame 304 which is fastened to the front wall of the sheet metal outer walls. A door molding 305, somewhat similar to the door molding shown in Fig. 1 extends around the door opening within the door jamb frame and is provided with grooves therein covered by finishing strips 306 wherein the refrigerant lines and the tubing connected to the thermostatic bulbs may pass.

Fastened to the rear face of the door molding by screws and sealed by a rubber sealing gasket are the freezing compartment inner liner structure 307 and the food compartment inner liner structure 308. Differing from the form shown in Fig. 1, the freezing compartment inner liner structure is located beneath the food compartment inner liner structure but is similarly fastened and connected by a structural member 309 of treated wood which however extends only between the front edges of the two inner liner structures. In a manner similar to that shown in Fig. 1, a rubber-like sealing member 310 extends from the face of this structural member 309 into sealing contact with the cabinet door 311 when in closed position.

The inner liner structure 307 enclosing the freezing compartment is provided with an integral plate-type evaporator structure 312 along its bottom wall but having an additional sheet of metal welded thereto so as to form an evaporating space between this additional sheet and the bottom wall. The food compartment inner liner structure 308 is also provided with an additional sheet 313 which is welded to the rear wall of the inner sheet metal liner structure and forms a part thereof. This additional sheet metal member 313 is spaced from the rear wall of the inner liner proper so as to form an evaporating space 314 therebetween similar to that of the ordinary plate-type evaporator. A groove 315 is provided in the bottom wall of the food compartment inner liner structure for collecting any drip and condensate which is removed from the groove by the tubing 316 to the drip tray 317 located within the freezing compartment. The inner liner structure 307 of the freezing compartment is also provided with a groove 318 which returns any condensate or liquid through the tubing 319 to the drip tray 317. An outer ornamental covering 320 is provided for covering the portion of the refrigerant lines, the electrical conductors and the drip tubing which passes over the outer face of the cabinet. This ornamental outer covering also provides the face plate for the switch box 321 which encloses the switch means for controlling the operation of the refrigerating system.

Referring now more particularly to Fig. 8 for the disclosure of the refrigerating system, there is shown diagrammatically a compressor 330 driven by a compressor driving motor 331 located within a sealed unit 332 and provided with a starting relay system 333 and unloading means 334 all of which may be similar to that shown in Fig. 4. The compressor is provided with a low pressure suction inlet 335, a high pressure suction inlet 336 and a discharge port 337 through which the compressed refrigerant is discharged and conducted to a condenser 338 provided with a receiver 339 from which the condensed refrigerant is conducted through a supply conduit means 340 to the expansion valves 391 and 392 preferably of the automatic type which control the flow of refrigerant to the evaporating means 312 formed in the bottom portion of the inner liner structure 307 of the freezing compartment and the evaporating means 314 formed in the rear wall of the inner liner structure 308 of the food compartment.

The refrigerant evaporates within each of these evaporating means because of the absorption of heat and the evaporated refrigerant from the evaporating means 312 of the inner liner structure 307 of the food compartment is conducted through a conduit 341 to a double acting valve structure 342 which in general is somewhat similar to the valve structure shown in Fig. 3 but which is actuated by the valve stem 343 which is connected through a yielding spring mechanism 344 to the main lever 345 of the freezing compartment switch 346. This double acting valve 342 has one outlet connecting with a return conduit 347 which connects with the low pressure inlet port 335 and a second outlet 348 forming a by-pass conduit connecting with the single acting valve structure 349 which controls the flow of refrigerant from the evaporating means 314 of the inner liner structure 308 of the food compartment which is conducted by the refrigerant conduit 350 to this single acting valve 349. This single acting valve structure 349 is provided with a valve stem 351 which is connected to a resilient spring connection 352 to the main lever 353 of the food compartment switch 354. The valve structure 349 is also provided with two outlets, one of which connects to the by-pass conduit 348 while the other connects to the high pressure return conduit 355 which connects to the high pressure inlet 336 of the compressor 330.

On its way to the high pressure port the return conduit 355 passes through a heat interchanger 356 which transfers the heat from the liquid in the liquid line 340 to the cold vapor in the return conduit 355. Similarly the return conduit 347 passes through a heat interchanger 357 which is located between the heat interchanger 356 and the evaporators of the system and which transfers additional heat from the liquid in the liquid supply conduit 340 to the colder vapor which passes through the low pressure return conduit 347. Thus, in this system full advantage is taken of the cold temperature existing in the return conduits 347 and 355. Preferably, these return conduits are insulated so as to retain the low temperature existing therein and to prevent superheating of the vapor as much as possible.

The double switch mechanism shown in this figure is not provided with the resilient connection between the two switches but this may be added if desired. Each of these switches 346 and 354 are provided with a similar snap acting mechanism which controls the opening and closing of their respective switch contacts 360 and 361. The main lever 345 of the switch 346 is actuated by the metal bellows 362 connected by tubing to the thermostatic bulb 363 located in heat exchange relation with the evaporating means provided in the inner liner structure 307 of the freezing compartment. The expansion of the metal bellows is controlled by a compression spring 364 which is provided with a peculiar type of spring retainer 365 threaded upon the temperature regulating screw 366 which is provided with an indicating finger manipulator 367 upon the opposite side of the outer covering and switch plate 320. This peculiar spring retainer 365 is provided with downwardly extending portions 368 which are adapted to engage and to move the switch lever 345 forcibly to open circuit position when the finger manipulator 367 is turned to the "off" position. This will forcibly shut off refrigeration to the freezing compartment when no refrigeration is desired therefor. The finger manipulator 367 may also be turned to other temperature regulating positions which vary the temperature of the inner liner structure 307 of the freezing compartment from very low freezing temperature such as 0° F. to relatively high food preserving temperatures such as 40 or 45° F. Thus, this compartment may be used either for freezing or ordinary food storage.

The food compartment switch 354 is also provided with a metal bellows 370 connected by tubing with a thermostatic bulb 371 located within the food compartment and spaced away and insulated from the walls therefrom so as to be responsive to the air therein. The metal bellows 370 controls the movement of the main lever 353 to control the opening and closing of the switch contacts 361 as well as the opening and closing of the valve 349 under the control of the compression type coil spring 372 and the temperature regulating screw 373 provided with a finger manipulator and indicating device 374 which may shut off refrigeration to the food compartment through the spring retainer 375 provided with the projecting portions 376 adapted to engage the main switch lever 353 to move the main switch lever 353 to the "off position," when the finger manipulator is turned to its "off position." The finger manipulator 374 also is provided with other positions which vary the temperatures of the air within the food compartment according to the desires of the housewife.

Instead of operating the valves 342 and 349 from the switches 346 and 354, separate thermostatic bulbs may be provided within the freezing compartment 307 and the food compartment 308 in order to control these valves according to the temperatures in the respective compartments independently of the switch means. A manual switch 377 is also provided for shutting off the entire refrigerating system. This system operates substantially in the same manner as that explained in connection with Fig. 2 with the exception that the valves 342 and 349 are controlled directly by the switch instead of providing electro-thermal actuating means therefor in series with the switch means. Also the projections upon the spring retainers are employed for independently shutting off the switches and valves instead of employing a separate shut off means as is shown in connection with Fig. 2.

Figure 9:
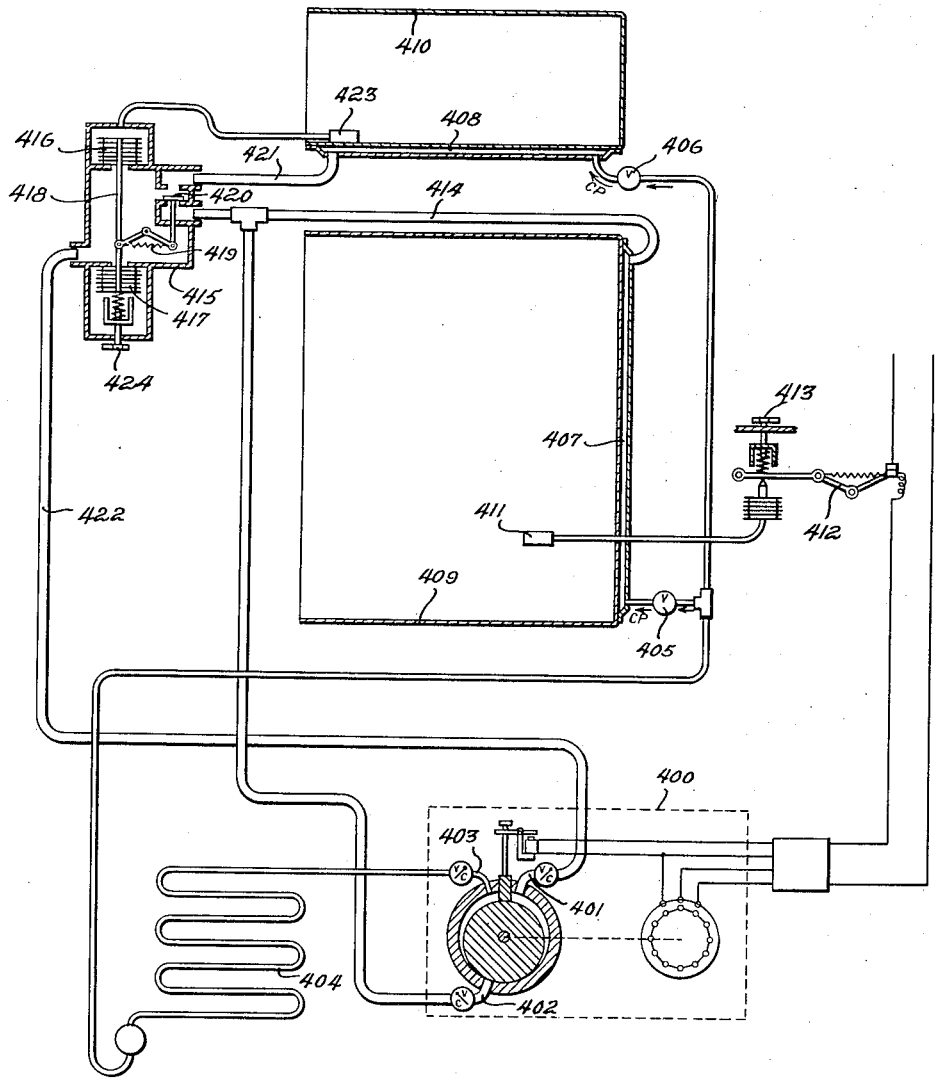
Fig. 9 is a diagrammatic illustration of a modified form of two-temperature refrigerating system for the refrigerator shown in Fig. 1.

In Fig. 9 a somewhat simplified system for the refrigerator shown in Fig. 1 is disclosed. In this system a similar type of motor compressor unit and starting system designated by the reference character 400 is shown and the compressor is provided with a low pressure suction inlet 401, a high pressure suction inlet 402 and a discharge port 403 through which the compressed refrigerant is discharged into the condensing means 404 provided with a receiver from which the liquid refrigerant is conducted under the control of the automatic expansion valves 405 and 406 to the evaporating means 407 and 408 forming a part of the inner liner structure 409 and 410 of the food compartment and freezing compartments respectively.

The operation of the motor-compressor unit is controlled by a thermostatic bulb 411 which is spaced and insulated from the inner liner structure 409 of the food compartment but in heat exchange relation with the air therein for controlling the operation of the switch means 412 located in series with the electric compressor motor circuit. This switch is provided with a temperature regulating and shut off means 413 which is similar to that shown in connection with the switches 346 and 354 shown in Fig. 8.

The outlet of the evaporating means 407 of the food compartment inner liner structure 409 is connected by a return conduit 414 to a double acting snap acting thermostatically controlled valve means 415 as well as to the high pressure suction inlet 402. This double acting snap acting valve means is provided with an upper bellows 416 and a lower bellows 417 connected together by a rod or stem 418 which in turn is connected to a snap acting mechanism 419 which in turn controls the valve 420. When in its lower position this valve 420 permits the flow of evaporated refrigerant from the freezing compartment evaporating means 408 through the conduit 421 to the valve 415 and through the valve to the low pressure suction conduit 422 which connects with the low pressure suction inlet. When the freezing compartment evaporating means requires no refrigerant, the thermostatic bulb 423 located within the freezing compartment in heat exchange relation with the inner liner structure 410 controls the movement of the valve structure 415 so that the valve 420 is moved into its uppermost position so as to shut off the flow of refrigerant from the freezing compartment evaporator structure and to permit the evaporated refrigerant from the food compartment evaporator structure 407 to flow into the low pressure suction inlet 401 through the valve structure 415 and the low pressure suction conduit 422.

Thus by this simplified structure the evaporating means 407 and 408 are maintained at different evaporating pressures and temperatures, full advantage is taken of the higher back pressure made possible by the higher evaporating pressures and temperature within the food compartment evaporator 407. The evaporating temperature and pressure of the freezing compartment are adequately controlled by the thermostat 423 and the switch means 415. The switch means 415 is provided with a finger manipulator 424 which is provided with a threaded adjusting spring means as well as a spring retainer which serves to vary the temperature of the freezing compartment evaporating means as well as for shutting off the freezing compartment. Thus this system retains substantially all the advantages of the previously mentioned systems.

Figure 10:
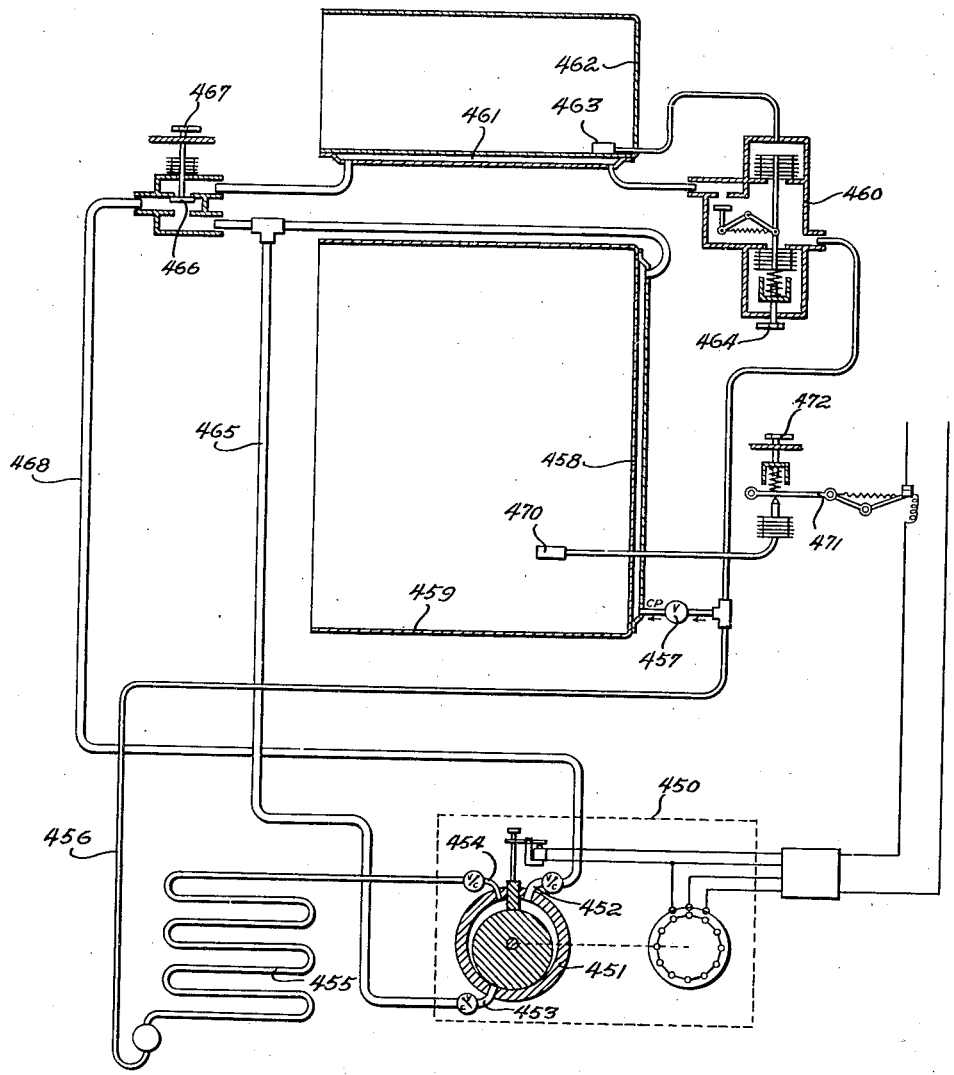
Fig. 10 is a diagrammatic illustration of another form of two-temperature refrigerating system for the refrigerator shown in Fig. 1.

In Fig. 10 another form of simplified system for the refrigerator shown in Fig. 1 is illustrated diagrammatically. In this form is used the same type of sealed motor-compressor unit, starting and unloading systems generally designated by reference character 450 and having a compressor 451 provided with a low pressure suction inlet port 452 and the high pressure suction inlet port 453 as well as a discharge port 454 through which the compressed gas discharged into the condensing means 455 provided with a receiver from which the liquid refrigerant is supplied through a supply conduit 456 to an automatic expansion valve 457 which controls the flow of liquid refrigerant into the evaporating means 458 forming a part of the inner liner structure 459 of the food compartment while a single acting snap acting or throttle type of thermostatic valve 460 controls the flow of liquid refrigerant to the evaporating means 461 formed within the bottom wall of the inner liner structure 462 enclosing the freezing compartment. This thermostatically controlled valve is controlled by the thermostat 463 located within the freezing compartment 462 and is similar to the double acting valve 416 of Fig. 9. This thermostatically controlled valve is provided with a finger manipulator 464 which, through a spring means, a spring retainer and threaded adjusting means, serves to regulate the temperature within the evaporating means 461 of the freezing compartment 462 as well as to shut off the flow of refrigerant thereto.

The outlet of the food compartment evaporating means is connected to the high pressure suction inlet 453 by the refrigerant conduit 465 as well as to a double acting manual control valve 466 which is provided with a manually operable finger manipulator 467 which through threaded means moves the valve 466 to permit either the flow of refrigerant from the freezing compartment evaporating means 461 through the refrigerant conduit 468 to the low pressure suction inlet 452 or which, as shown, may be moved to prevent the flow of refrigerant from the freezing compartment evaporating means 461 and to permit the flow of refrigerant from the food compartment evaporating means 458 through the valve 466 to the low pressure suction conduit 468 to the low pressure suction inlet port 452.

The operation of the motor-compression unit is controlled by a thermostatic bulb 470 which is spaced from and insulated from the inner liner structure of the food compartment but which is in heat exchange relation with the air therein. This thermostatic bulb operates a switch means 471 which is similar to the switch means 412 shown in Fig. 9 and which similarly is provided with a finger manipulator 472 and threaded spring and spring adjusting means and a spring retainer means for varying the opening and closing temperatures of the switch means as well as for positively holding the switch means in the position to shut off the refrigerator. This system is similar to Fig. 9 and provides substantially all of the advantages of the systems described and shown in Figs. 1 to 8 inclusive.

In Fig. 11 there is shown another modified form of two temperature system which may be used in connection with the refrigerator shown in Fig. 1. This system shown in Fig. 11 has an ordinary motor-compressor unit generally designated by the reference character 490 provided with a single suction inlet 491 and a single outlet 492 which conducts the compressed refrigerant to a condensing means 493 provided with a receiver from which the liquid refrigerant is supplied to the automatic expansion valve 494 which controls the supply of refrigerant to the evaporating means 495 formed within the rear wall structure of the inner liner structure 496 enclosing the freezing compartment while a second automatic expansion valve 497 is provided for controlling the flow of liquid refrigerant to the evaporating means 498 formed within the bottom wall structure of the sheet metal inner liner structure 499 enclosing the freezing compartment.

The food compartment 496 is provided with a thermostatic bulb 500 which is spaced and insulated from the inner liner structure but is located within the free air therein so as to be responsive to the temperature of the air. This thermostatic bulb 500 is connected to a switch means 501 similar to the switch means 412 and 471 shown in Figs. 9 and 10. This switch means has a finger manipulator 502 provided with "off" and "temperature regulating" positions and operating a threaded adjusting means, a spring retainer and a temperature regulating spring in order to control the temperature at which the switch means 501 which opens and closes as well as for positively holding open the switch means.

A thermostatic bulb 503 is located within the freezing compartment 499 and is connected to a second switch means 504 which is also provided with a finger manipulator 505 capable of regulating the temperature at which the switch 504 opens and closes within rather wide limits and also to positively hold the switch 504 in the open position. The switches 501 and 504 are connected to a source 506 of electric energy supply and to the compressor driving motor of the motor-compressor unit 490 in parallel electric circuit relation so that the closing of either of these switches will close the electric circuit to the compressor driving motor.

In series with the food compartment switch 501 there is connected an electro-magnetic valve 507 which controls the flow of evaporated refrigerant from the food compartment evaporating means 495 into the common return conduit 508. In series with the freezing compartment switch 504 there is also provided an electro-magnetic valve 509 which is similar to the electro-magnetic valve 507 and which controls the flow of the evaporated refrigerant from the freezing compartment evaporating means 498 into the common return conduit 508. Electro-thermal valves like the valve 80 in Fig. 2 may be used in place of these electro-magnetic valves. Under certain conditions where less accurate temperature control of the freezing compartment is sufficient the electro-magnetic valve 509 may be dispensed with.

A check valve 510, better illustrated in Figs. 12 and 13, is also provided for preventing the flow of high pressure gas in the return conduit back into the low pressure or freezing compartment evaporating means 498. This is advisable since if the electro-magnetic valves 507 and 509 should both be open at the same time the high pressure evaporated refrigerant, provided by the food compartment evaporator 495, might tend to flow from the comon return conduit into the low pressure evaporating means 498 and condense therein.

Referring now to Figs. 12 and 13 for a more complete illustration of the check valve 510 there is shown a valve structure provided with a shoulder supporting a screen 512 and a second shoulder 513 which supports the flange 514 of a valve 515 formed of a moulded rubber-like material such as the "Duprene" mentioned in connection with the check valve 202. This valve is provided with a rounded upper head portion having the contour of a segment of a sphere in order to properly take care of the pressure stresses thereon together with an integral spider-like guide portion 516 which extends directly downwardly therefrom into the smaller entering portion 517 of the check valve structure. This guide portion 516 guides the valve in its vertical movement and insures proper seating of the valve when in its lower position.

The valve is opened and excess pressure within the smaller tubular portion 517 which lifts the valve off its seat and permits the flow of gas round the surfaces of the guide portion and beneath the lifted flange portion into the portion above the valve contained screen 512. This valve is noiseless and conforms to the irregularities of the seat, is reliable and is low in cost.

Figure 14:
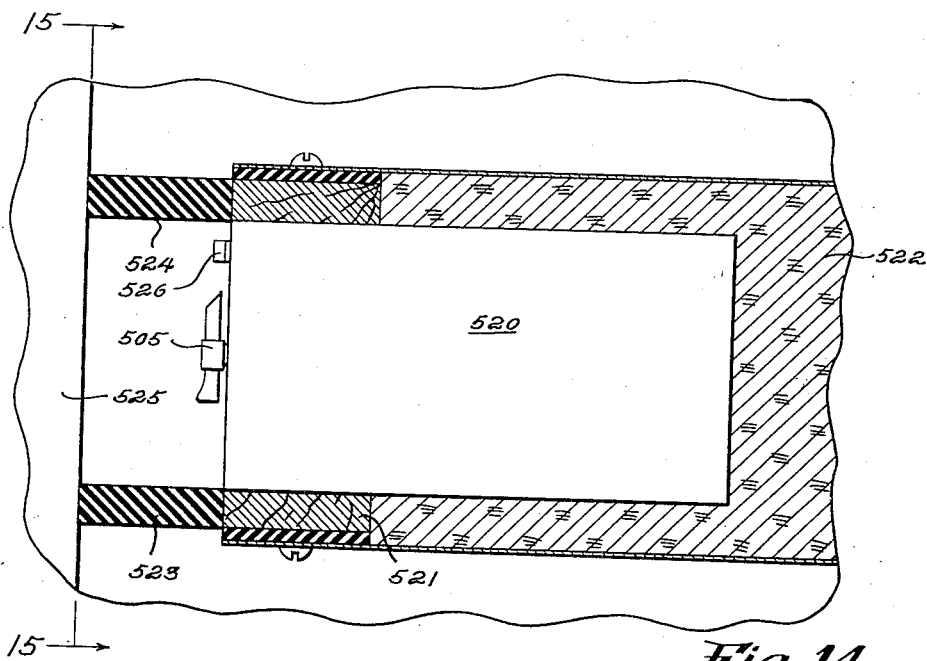
Fig. 14 is a fragmentary view of a modified form of two-temperature refrigerator preferably employing the system shown in Fig. 11 showing the location of the switch box.
Figure 15:
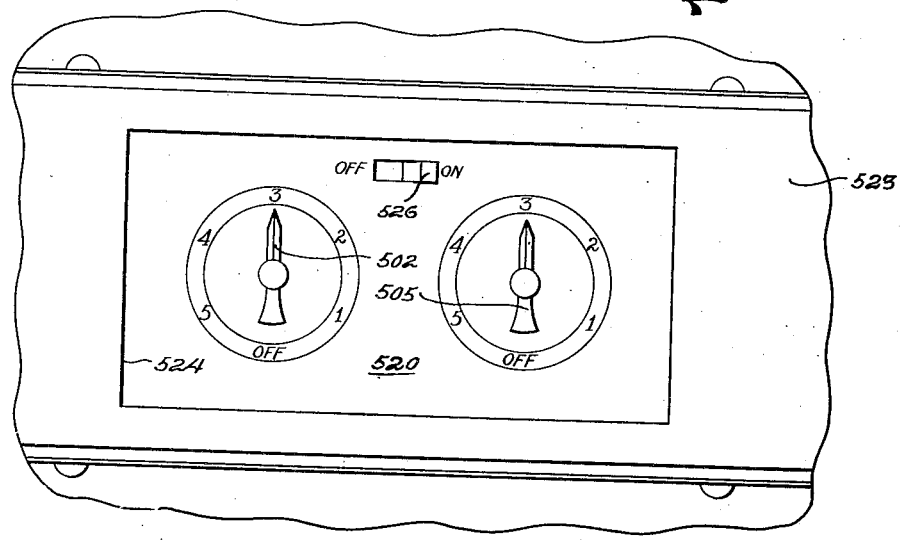
Fig. 15 is a sectional view along the line 15—15 of Fig. 14.

I also provide an additional manual switch 518 for shutting off the entire system. This system approaches the previously described systems both in thermal efficiency as well as in flexibility. This manual switch 518 and the switches 501 and 504 are conveniently grouped into a switch box 520 such as is shown in Fig. 14. This switch box 520 is preferably mounted within the insulating partition between the freezing and food compartments of the refrigerator. This switch box preferably is flush with the front face of the wooden frame member 521 which connects the freezing and food compartments. The switch box extends rearwardly from the front face of the wooden member through an aperture therein and extends into the insulating space 522 between the freezing and food compartments. The wooden connecting member 521 is preferably provided with a sponge rubber sealing member 523 which has an opening 524 therein for receiving the switch box 520 and permitting access to the face of the switch box. This rubber sealing member is adapted to contact with the door 525 when in its closed position so as to seal the freezing and food compartments from each other and also to seal the switch box from these compartments. By sealing the switch box from these compartments, the moist corrosive air from these compartments is prevented from gaining access to the switch box or any parts thereof. Upon the face of the switch box 520 there is provided a finger manipulator device 526 for opening and closing the manual switch 518 as well as the finger manipulators 502 and 505 of the switches 501 and 504 which cooperate with indices provided upon the face of the switch box designating the "off" position as well as various temperature regulating positions numbered from 1 to 5.

In Fig. 16 another form of two-temperature refrigerating system which may be used with the refrigerator cabinet in Fig. 1 is shown. In this system there is provided a motor-compressor unit 540 provided with a single suction inlet 541 and a single discharge outlet 542 which supplies the compressed refrigerant to a condenser 543 provided with a receiver from which the liquid refrigerant is forwarded through a supply conduit 544 to an expansion valve 545 which controls the supply of liquid refrigerant to an evaporating means 546 formed within the rear wall structure of the inner liner structure 547 which surrounds the food compartment. This liquid refrigerant is also supplied to a second expansion valve 548 which controls the supply of liquid refrigerant to the evaporating means 549 formed in the bottom portion of the sheet metal inner liner structure 550 which surrounds the freezing compartment.

The outlet of the food compartment evaporating means 546 is connected by a refrigerant conduit 551 to a T connection 552 which is also connected by the refrigerant conduit 553 to the outlet of the evaporating means 549 as well as by a refrigerant conduit 554 to the suction inlet of the motor compressor means 540. The flow of evaporated refrigerant from the food compartment evaporator 546 is controlled by a valve 556 located in the refrigerant conduit 551 and operated by a thermostatic bulb 557 separated and insulated from the sheet metal walls of the food compartment inner liner structure 547 but which is in heat exchange relation with and surrounded by the air within the food compartment. This thermostatic bulb opens the valve when the air in the food compartment reaches a predetermined high limit and permits the evaporation of refrigerant. When the air within the food compartment has been cooled sufficiently, this valve closes and in this way a suitable evaporating pressure and temperature is maintained within the evaporating means 546 of the food compartment.

A hand valve 558 is provided in the conduit 553 for closing the outlet of the freezing compartment evaporator in order to shut off refrigeration to the freezing compartment when such refrigeration is not required. A check valve 559 is also provided for preventing high pressure gas from the high pressure refrigerant conduit 551 and the common refrigerant conduit 554 from flowing back into the low pressure evaporator. This check valve structure is better shown in Figs. 17 and 18 and has a small diameter inlet portion 560 which conducts the gas to an enlarged portion provided with a shoulder 561 upon which is seated a valve 562 formed entirely out of some suitable rubber-like material such as "Duprene." This rubber-like valve 562 is provided with a humped hemi-spherical disc portion 563 which is adapted to rest upon the shoulder 561 to prevent the flow of gas downwardly into the small diameter portion 560. This portion is preferably made in the form of a segment of a sphere in order to take care of the stresses exerted thereon by the differences in pressure. The spider-like guides 564 in the shape of a cross extend above the flange portion 563 and guide the valve in a vertical direction by contacting with the side walls 565 of the check valve chamber. Above the rubber-like valve 562 there is provided a screen 566 which serves as a filter and also prevents the rubber-like valve 562 from rising too far off its seat.

The operation of the motor-compressor unit 540 is controlled by the rather familiar low pressure control including a switch 570 which is operated by a bellows connected to the return conduit 554 and which controls the opening and closing of the electric motor compressor circuit. The switch 570 is also provided with a finger manipulator 571 which is employed to vary the opening and closing points of the switch as well as to hold the switch in the "off" position for shutting off the entire refrigerator. If desired, the switch 570 may be controlled by the temperature of the freezing compartment 550 of the evaporating means thereof. This form of system also provides higher evaporating pressures and temperatures for the food compartment evaporating means than for the freezing compartment evaporating means and its thermal efficiency approaches that of the other systems heretofore explained. The thermostatic bulb 557 provides an adequate control for the temperatures within the food compartment while the finger manipulator 571 provides the control for the temperatures in the freezing compartment. This finger manipulator is provided with an adjustment range sufficient to vary the temperature of the freezing compartment from low freezing temperatures such as 0° F. to temperatures in the neighborhood of 40 to 50° F. Thus when freezing is not required, this freezing compartment may be used as an ordinary food storage compartment and the entire system operated at a high back pressure.

Figure 19:
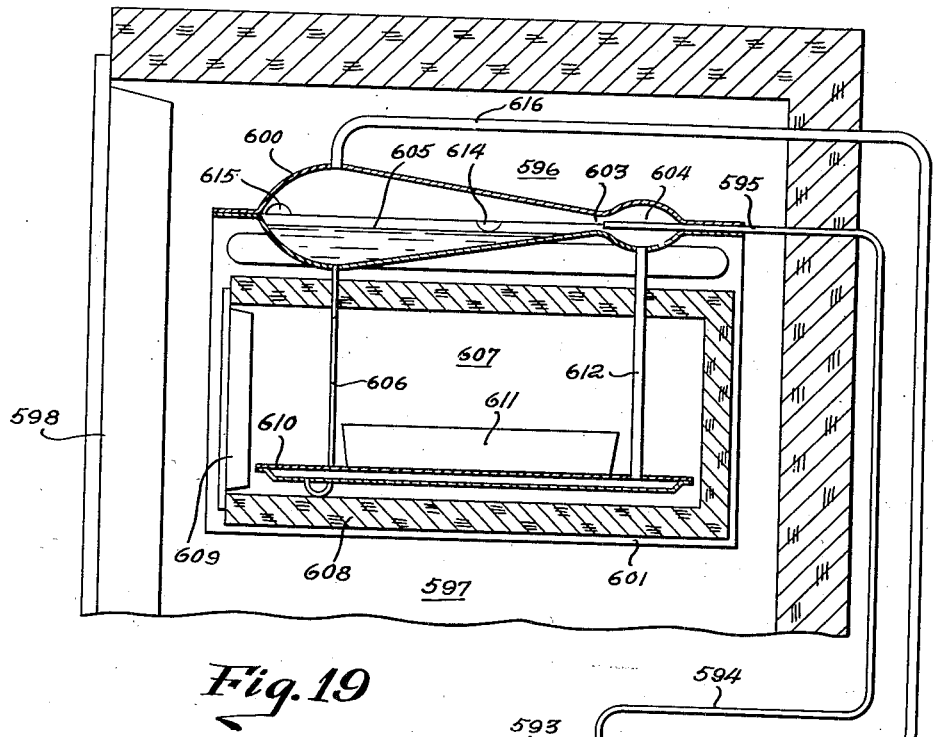
Fig. 19 is a sectional view through another form of two-temperature refrigerator.
Figure 20:
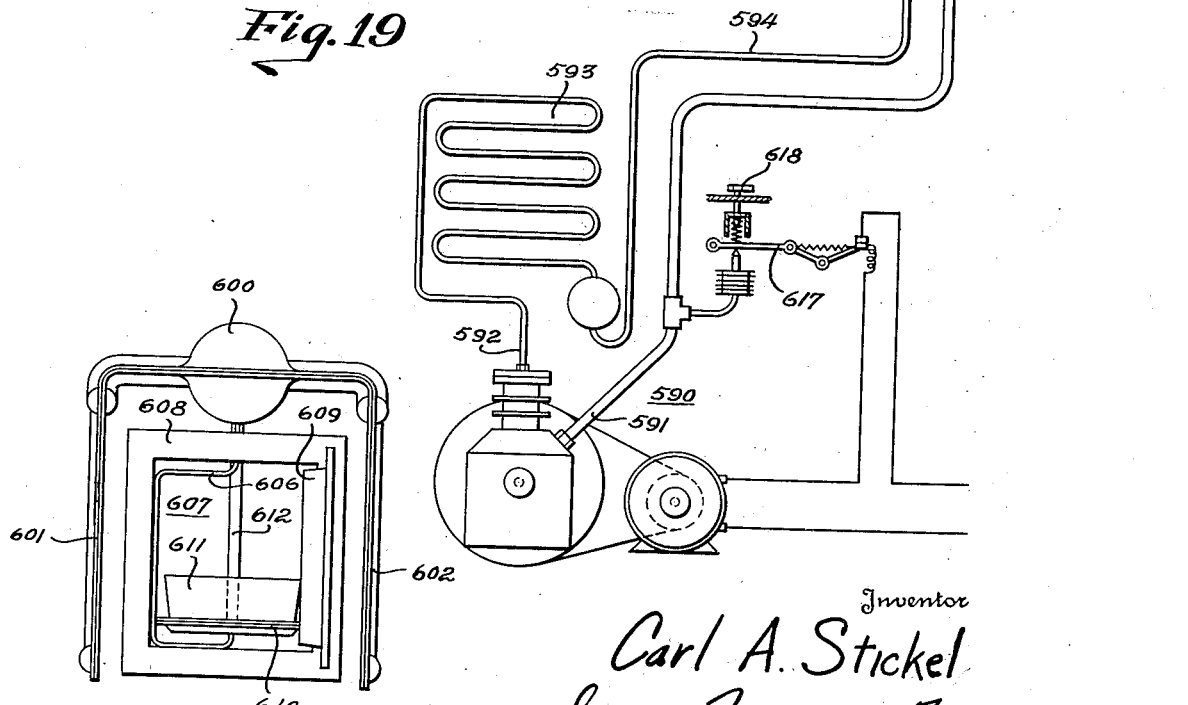
Fig. 20 is a front view of the cooling means shown in Fig. 19.

Figs. 19 and 20 disclose another form of two temperature refrigerating system in which an ordinary motor-compressor unit 590 is provided having a single suction inlet 591 and a single discharge outlet 592 and from which the compressed refrigerant is forwarded to a condensing means 593 provided with a receiver from which the liquid refrigerant is forwarded through a supply conduit 594 to a straight restricting nozzle or jet 595 which controls the flow of refrigerant into the evaporating means 596 located within the food compartment 597 of a refrigerator cabinet 598. This evaporating means 596 is formed in two parts as shown in Fig. 20. The outer portion of this evaporating means is formed of a plurality of sheets of metal formed into an inverted U-shape and having a liquid chamber 600 at the top and thin double walled refrigerant containing side portions 601 and 602.

The liquid chamber 600 is provided with a Venturi portion 603 which divides the liquid chamber 600 from a suction chamber 604. The end of the restricting nozzle or jet 595 is provided at a suitable point in the Venturi portion 603 so that it forms a jet pump which tends to pump refrigerant vapor from and to create a lower pressure within the low pressure chamber 604. The restrictor or jet 595 discharges liquid refrigerant into the liquid chamber 600 and maintains this liquid chamber filled with liquid refrigerant normally at the level indicated by the reference character 605. This liquid flows down through a second restrictor 606 into a freezing chamber 607 provided with insulated walls 608 and a door 609 for providing access to the freezing chamber. Within the freezing chamber 607 there is provided a refrigerant plate 610 formed of two sheets of metal welded together which is fed by liquid refrigerant from the bottom of the liquid chamber 600 through the restrictor tube 606. Suitable refrigerant passages are provided within the freezing plate and this freezing plate removes heat from the freezing chamber and the ice tray 611 resting thereon by evaporating some of the refrigerant therein which is withdrawn through a suction tube 612 into the low pressure chamber 604. Thus a lower evaporating pressure and temperature is created within the freezing plate 610 by employing otherwise wasted energy in the jet pump provided by the restrictor or jet 595 in the venturi 603.

Liquid refrigerant in the liquid chamber 600 overflows through outlets 614 which are provided upon each side of the liquid chamber 600 for conducting liquid refrigerant to the outer side walls 601 and 602 in order to cool the interior of the refrigerator cabinet 598. The liquid refrigerant evaporating within the side walls is returned to the liquid chamber through the passages 615 formed between the sheets of metal upon the opposite sides of the liquid chamber 600. This evaporated refrigerant is then returned to the compressor through the return conduit 616 which removes the evaporated refrigerant from the top of the liquid chamber and returns it to the compressor. The operation of the motor compressor unit is controlled by the familiar low pressure control switch designated by the reference character 617 which is located in series with the electric motor and which is provided with a finger manipulator 618 for varying the opening and closing temperatures thereof as well as for shutting off the switch as heretofore explained. If desired, this switch may be controlled thermostatically by the temperature of either the inner or the outer portion of the evaporating means.

This jet type of two temperature system is exceptionally efficient since the energy which is wasted in the expansion control device in other systems, is usefully employed in the jet pump for creating the lower evaporating pressure and temperature in the freezing portion of the evaporating means. Thus the power requirements of the system correspond to those of an ordinary system of equal capacity operating at the temperature and pressure of the high temperature portion of the evaporating means while a freezing effect is obtained without the use of additional power or energy which is required in ordinary systems because of the lower evaporating temperature and pressure required for freezing purposes.

While the form of embodiment of the invention as herein disclosed, constitutes a preferred form, it is to be understood that other forms might be adopted, all coming within the scope of the claims which follow.

What is claimed is as follows:

1. Refrigerating apparatus including a cabinet having a plurality of open box-like sheet metal inner lining members enclosing a plurality of compartments to be cooled, one of said inner liner structures having spaced sheets of metal forming its rear wall providing a refrigerant evaporating structure, another of said inner liner structures having spaced sheets of metal forming its bottom wall portion providing a refrigerant evaporating structure, a motor driven compressing and condensing means for supplying liquid refrigerant to said evaporating structures and for withdrawing evaporated refrigerant therefrom including a compressor having high pressure and low pressure suction ports one of said suction ports being connected to one of said evaporator structures and another said suction ports being connected to another of the evaporator structures, thermostatic means responsive to the temperature of each of said compartments to be controlled, said thermostatic means controlling the operation of a motor driven compressing and condensing means and controlling the flow of evaporated refrigerant from the evaporator structures to the suction ports, a door for access to the compartment enclosed by the inner liner structures, insulating means for insulating the inner liner structures from each other, and resilient means extending from said insulating means and cooperating with the door when in closed position for sealing the compartments from each other when the door is closed.

2. Refrigerating apparatus including a unitary cabinet having separate freezing and food compartments incorporated therein, a unitary refrigerating system having a freezing compartment evaporating means in heat exchange relation to the freezing compartment and a food compartment evaporating means in heat exchange relation with the food compartment, refrigerant liquefying means for supplying liquid refrigerant to and for withdrawing evaporated refrigerant from said evaporating means for creating temperatures below freezing in the freezing compartment and temperatures above freezing in the food compartment and means including a manipulator, operable at will for varying the evaporating pressure and temperature in each of said evaporating means independently of the other, said means including a manipulator being also effective to control the operation of the refrigerant liquefying means.

3. Refrigerating apparatus including a unitary cabinet having separate freezing and food compartments incorporated therein, a refrigerating system having a freezing compartment evaporating means in heat exchange relation to the freezing compartment and a food compartment evaporating means in heat exchange relation with the food compartment, refrigerant liquefying means connected in refrigerant circuit relation with each of said evaporating means for supplying liquid refrigerant to and for withdrawing evaporated refrigerant from said evaporating means and thermostatically controlled means cooperating with said refrigerating system for maintaining during all normal operation definitely higher evaporating temperatures and pressures in the food compartment evaporating means than in the freezing compartment evaporating means, and manipulating means for adjusting said thermostatically controlled means to adjust the evaporating pressure and temperature in the freezing compartment evaporating means independently of the food compartment evaporating means, said manipulating means being also provided with indicating means for indicating the adjustment of the thermostatically controlled means.

4. Refrigerating apparatus including a plurality of refrigerant evaporating means, a compressing and condensing means for supplying liquid refrigerant to said evaporating means, said compressing means having a plurality of suction entrances connected to different evaporating means for withdrawing evaporated refrigerant from said evaporating means at different suction pressures, and means for conducting refrigerant from an evaporating means connected to one suction entrance to another suction entrance and preventing the flow of refrigerant from another evaporating means to said another suction entrance.

5. Refrigerating apparatus including a compressing and condensing means having a low pressure suction entrance and a higher pressure suction entrance, an evaporating means connected to the low pressure suction entrance and a second evaporating means connected to the higher pressure suction entrance, said compressing and condensing means being connected to said evaporating means to supply liquid refrigerant thereto, and means responsive to temperature conditions of the first mentioned evaporating means for conducting evaporated refrigerant from said second evaporating means to the low pressure suction entrance and closing the outlet of the first mentioned evaporating means when no refrigeration is desired for the first mentioned evaporating means.

6. Refrigerating apparatus including an insulated cabinet having a plurality of box-like inner sheet metal lining members having an open side, one of said lining members enclosing a freezing compartment and another a food compartment, refrigerant evaporating means in heat exchange relation with a vertical wall of the lining member enclosing the food compartment and the bottom wall of the lining member enclosing the freezing compartment, and refrigerant liquefying means for supplying liquid refrigerant to, and for withdrawing evaporated refrigerant from said evaporating means.

7. Refrigerating apparatus including an insulated cabinet having a plurality of box-like inner sheet metal lining members having an open side, one of said lining members enclosing a freezing compartment and another a food compartment, insulating means separating and surrounding said lining members, said insulating means including structural means having low heat conductivity extending around the door opening, said inner lining members being fastened to the structural means at edges adjacent the open sides, a cabinet door for closing said door opening and refrigerating means for cooling said freezing and food compartments.

8. Rerigerating apparatus including a refrigerant evaporating means having a plurality of evaporating portions, a condenser connected to said evaporating means for supplying liquid refrigerant thereto, means for creating different refrigerant evaporating temperatures and pressures within said evaporating portions including a rotary compressing means having a compressing chamber, a divider block and an eccentrically movable impeller movable within the compressing chamber and cooperating with divider block to compress refrigerant, said compressing chamber having a suction inlet and an outlet on either side of the divider block communicating with the compressing chamber, said outlet being connected to the condenser and provided with a check valve, said suction inlet being connected to the evaporating portion having the lower evaporating pressure and temperature, said suction inlet being provided with a check valve, a second suction inlet provided with a check valve communicating with the compressing chamber intermediate the first mentioned suction inlet and the outlet, said second suction inlet being connected to another evaporating portion having a higher evaporating pressure and temperature, a control means affected by the low pressure and temperature evaporating portion and a control means affected by said high pressure and temperature evaporating portion, each of said control means combining to control said apparatus.

9. Refrigerating apparatus including a refrigerant evaporating means having a plurality of evaporating portions, a condenser connected to said evaporating means for supplying liquid refrigerant thereto, means for creating different refrigerant evaporating temperatures and pressures within said evaporating portions including a rotary compressing means having a compressing chamber, a divider block and an eccentrically movable impeller movable within the compressing chamber and cooperating with divider block to compress refrigerant, said compressing chamber having a suction inlet and an outlet on either side of the divider block communicating with the compressing chamber, said outlet being connected to the condenser and provided with a check valve, said suction inlet being connected to the evaporating portion having the lower evaporating pressure and temperature, said suction inlet being provided with a check valve, a second suction inlet provided with a check valve communicating with the compressing chamber intermediate the first mentioned suction inlet and the outlet, said second suction inlet being connected to another evaporating portion having a higher evaporating pressure and temperature and means cooperating with the divider block for unloading the compressing means during the starting thereof.

10. Refrigerating apparatus including a unitary cabinet having separate freezing and food compartments incorporated therein, a refrigerating system having a freezing compartment evaporating means in heat exchange relation to the freezing compartment and a food compartment evaporating means in heat exchange relation with the food compartment, electrically controlled valve means for individually controlling the withdrawal of refrigerant from said freezing compartment evaporating means and said food compartment evaporating means, electrically driven liquefying means connected in refrigerant circuit relation with said freezing compartment evaporating means and said food compartment evaporating means, switch means responsive to freezing compartment temperature conditions and to food compartment temperature conditions, and an electric circuit connected to said electrically driven liquefying means and said electrically controlled valve means and said switch means, one of the switch means and one of the valve means being connected in electrical series circuit relation with each other and the liquefying means but in parallel electrical circuit relation with another of said valve means and another of said switch means, said another valve means and said another switch means being connected in electrical series circuit relation with each other and with the liquefying means.

11. Refrigerating apparatus including a refrigerant evaporating means having a plurality of evaporating portions, a condenser connected to said evaporating means for supplying liquid refrigerant thereto, means for creating different refrigerant evaporating temperatures and pressures within said evaporating portions including rotary compressing means having a compressing chamber, said compressing chamber being provided with impeller means and means for maintaining a seal between the impeller and one portion of the compressing chamber wall, said compressing chamber having a suction inlet on one side of said seal and an outlet on the opposite side of said seal, said outlet being connected to the condenser, said suction inlet being connected to the evaporating portion having the lower temperature and pressure, a second suction inlet communicating with the compressing chamber intermediate the first mentioned suction inlet and the outlet, said second suction inlet being connected to another evaporating portion having the higher evaporating temperature and pressure, a control means affected by the low pressure and temperature evaporating portion and a control means affected by said high pressure and temperature evaporating portion, each of said control means combining to control said apparatus.

12. Refrigerating apparatus including ice freezing and food preserving means including ice freezing evaporating means and food preserving evaporating means insulated from each other, an electrically driven refrigerant liquefying means connected in series refrigerant circuit relation with each of said evaporating means, electrically controlled valve means for individually controlling the circulation of refrigerant through each of said evaporating means, switch means responsive to the freezing evaporating means and switch means affected by the food preserving evaporating means, and an electric circuit connected to said electrically driven liquefying means and said electrically controlled valve means and said switch means, one of said switch means and one of the valve means being connected in electrical series circuit relation with each other and the liquefying means but in parallel electrical circuit relation with another of said valve means and another of said switch means, said another valve means and said another switch means being connected in electrical series circuit relation with each other and with the liquefying means.

13. Refrigerating apparatus including a plurality of refrigerant evaporating means, a compressing and condensing means for supplying liquid refrigerant to said evaporating means, said compressing means having a plurality of suction entrances connected to different evaporating means for withdrawing evaporated refrigerant from said evaporating means at different suction pressures, separate suction conduits connecting said evaporating means and said suction entrances, valve means in the suction conduits between said evaporating means and said suction entrances, said valve means being provided with means for conducting refrigerant from one suction conduit to another suction conduit.

14. Refrigerating apparatus including a plurality of refrigerant evaporating means, a compressing and condensing means for supplying liquid refrigerant to said evaporating means, said compressing means having a low pressure suction entrance connected to one of the evaporating means, said compressing means having a high pressure suction entrance connected to a second evaporating means, and means for shutting off the flow of refrigerant out of one of the evaporating means and by-passing the refrigerant from another of the evaporating means to the suction entrance of the evaporating means which has been shut off.

15. Refrigerating apparatus including a plurality of refrigerant evaporating means, a compressing and condensing means for supplying liquid refrigerant to said evaporating means, said compressing means having a low pressure suction entrance connected to one of the evaporating means, said compressing means having a high pressure suction entrance connected to a second evaporating means, and means for shutting off the flow of refrigerant out of said one evaporating means connected to the low pressure suction entrance and by-passing the refrigerant from the second evaporating means to the low pressure suction entrance.

16. Refrigerating apparatus including a plurality of refrigerant evaporating means, a compressing and condensing means for supplying liquid refrigerant to said evaporating means, said compressing means having a low pressure suction entrance connected to one of the evaporating means, said compressing means having a high pressure suction entrance connected to a second evaporating means, means for conducting refrigerant from an evaporator connected to one suction entrance and by-passing said refrigerant into another suction entrance, and means for preventing said by-passed refrigerant from entering the evaporating means connected to said another suction entrance.

17. Refrigerating apparatus including a plurality of refrigerant evaporating means, a compressing and condensing means for supplying liquid refrigerant to said evaporating means, said compressing means having a low pressure suction entrance connected to one of the evaporating means, said compressing means having a high pressure suction entrance connected to a second evaporating means, means for by-passing the refrigerant leaving the second evaporating means to the low pressure suction entrance, and means for preventing the by-passed refrigerant from entering said one evaporating means connected to the low pressure suction entrance.

18. Refrigerating apparatus including an insulated cabinet having a plurality of separate storage compartments therein, said storage compartments being separated by insulating means, a metal inner liner member for each of said storage compartments, the metal inner liners of each of said storage compartments being separated by the insulating means, and a refrigerant liquefying unit and conducting means for circulating refrigerant into direct heat exchange relation with each of said metal inner liner members.

19. Refrigerating apparatus including a cabinet and a metal member forming a plurality of walls of a compartment therein, said metal member being provided with an opening therein, a cooling element extending over said opening for closing said opening, said cooling element having a portion thereof forming a part of the walls of said compartment, said cooling element being a separate element distinct from said metal member, and a circulating means connected to said cooling element for supplying a refrigerant medium to the cooling element and for withdrawing the refrigerant medium from the cooling element.

20. Refrigerating apparatus including a refrigerator cabinet provided with a compartment to be cooled, an inner liner for said compartment comprising a metal member lining a plurality of walls of said compartment, said metal member having an opening therein, a removable cooling element extending over and closing said opening, said cooling element constituting a portion of said inner liner but being separate from and removable from said metal member, and means connected to said cooling element for supplying a refrigerant medium to and for withdrawing the refrigerant medium from said cooling element.

21. Refrigerating apparatus including a refrigerator cabinet provided with a compartment to be cooled, an inner liner for said compartment comprising a metal member lining a plurality of walls of said compartment, said metal member having an opening therein, a removable cooling element extending over and closing said opening, said cooling element constituting a portion of said inner liner but being separate from and removable from said metal member, and means connected to said cooling element for supplying a refrigerant medium to and for withdrawing the refrigerant medium from said cooling element, said inner liner being provided with a gasket between said cooling element and the adjacent edges of the opening in said metal member.

22. Refrigerating apparatus including a low temperature evaporating means, a high temperature evaporating means, means for maintaining a high evaporating pressure in the high temperature evaporating means and a lower evaporating pressure in the low temperature evaporating means including a liquefying means for withdrawing evaporated refrigerant from said high temperature and said low temperature evaporating means and for supplying liquid refrigerant to said evaporating means, and means for conducting said liquid refrigerant supplied by said liquefying means first into heat exchange relation with the evaporated refrigerant withdrawn from said high temperature evaporating means and then conducting said liquid refrigerant into heat exchange relation with the evaporated refrigerant withdrawn from said low temperature evaporating means.

23. Refrigerating apparatus including an evaporating means, an electrically controlled liquefying means for supplying liquid refrigerant to and for withdrawing evaporated refrigerant from said evaporating means, switch means affected by temperature conditions of said evaporating means for controlling said liquefying means, and valve means mechanically connected to and operated by the switch means for controlling the circulation of refrigerant through said evaporating means.

24. Refrigerating apparatus including a plurality of evaporating means, a liquefying means for supplying liquid refrigerant to and for withdrawing evaporated refrigerant from the evaporating means, a separate control means for individually controlling the circulation of refrigerant through each of said plurality of evaporating means, and spring means for yieldingly interconnecting said separate control means to cause each of said control means to yieldingly affect the other.

25. Refrigerating apparatus including a plurality of evaporating means, a liquefying means for supplying liquid refrigerant to and for withdrawing evaporated refrigerant from the evaporating means, separate control means for individually controlling the circulation of refrigerant through each of said plurality of evaporating means, and means for interconnecting said control means to cause each of the control means to urge similar action in the other control means to cause circulation of refrigerant through both evaporating means at the same time.

26. The method of refrigerating a plurality of evaporators, which comprises vaporizing refrigerant in the evaporators, separately withdrawing the vaporous refrigerant from the evaporators, condensing the withdrawn refrigerant, conveying the condensed refrigerant to the evaporators in parallel and varying the heat content of the condensed refrigerant supplied to an evaporator in response to variations in the temperature of the vaporous refrigerant separately withdrawn from another evaporator.

27. The method of refrigerating a plurality of evaporators, which comprises vaporizing refrigerant in the evaporators, separately withdrawing the vaporous refrigerant from the evaporators, condensing the withdrawn refrigerant, conveying the condensed refrigerant to the evaporators and transferring heat from the condensed refrigerant supplied to one of the evaporators to the vaporous refrigerant separately withdrawn from another of the evaporators.

28. In refrigerating apparatus, the combination of relatively high and low temperature refrigerant evaporators, a mechanism having first and second inlets for refrigerant vaporized in the evaporators, means for establishing communication between the low temperature evaporator and said first inlet during periods when the low temperature evaporator is active, means for also establishing communication between the higher temperature evaporator and said second inlet during periods when both of said evaporators are active and means for establishing communication between the higher temperature evaporator and both of said inlets when only the higher temperature evaporator is active.

29. In apparatus for refrigerating low and high temperature zones of a refrigerator, the combination of relatively low and high temperature evaporators for cooling the low and high temperature zones, respectively, a compressor having first and second inlet ports for refrigerant vaporized in the evaporators, means responsive to demands for refrigeration within the zones and effective to establish communication between the low temperature evaporator and the first compressor port when the low temperature zone demands refrigeration, to establish communication between the low temperature evaporator and the first compressor port and between the high temperature evaporator and the second compressor port when both zones demand refrigeration and to establish communication between the high temperature evaporator and both of said compressor ports when the high temperature zone demands refrigeration and the low temperature zone is satisfied.

30. Refrigerating apparatus including a plurality of refrigerant evaporating means, a compressing and condensing means for supplying liquid refrigerant to said evaporating means, said compressing means having a low pressure suction entrance connected to the first of the evaporating means, said compressing means having a high pressure suction entrance connected to a second of the evaporating means, and pressure operated means for by-passing some refrigerant from the second evaporating means to the low pressure suction entrance.

CARL A. STICKEL.